United States Patent
Manssen et al.

(10) Patent No.: US 9,671,765 B2
(45) Date of Patent: *Jun. 6, 2017

(54) METHODS AND APPARATUS FOR TUNING CIRCUIT COMPONENTS OF A COMMUNICATION DEVICE

(71) Applicant: BlackBerry Limited, Waterloo (CA)

(72) Inventors: Keith Manssen, Crystal Lake, IL (US); Carsten Hoirup, Raleigh, NC (US); Matthew Russell Greene, Crystal Lake, IL (US); Simon Andrew Hughes, Waterloo (CA); Steven Mark Morelen, Cary, NC (US); Victor Galperin, Waterloo (CA); John Hanford Spears, Johnsburg, IL (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 168 days.

This patent is subject to a terminal disclaimer.

(21) Appl. No.: 14/609,512

(22) Filed: Jan. 30, 2015

(65) Prior Publication Data
US 2015/0142139 A1 May 21, 2015

Related U.S. Application Data

(63) Continuation of application No. 13/486,914, filed on Jun. 1, 2012, now Pat. No. 8,948,889.

(51) Int. Cl.
G05B 13/02 (2006.01)
H04B 1/04 (2006.01)

(52) U.S. Cl.
CPC ........... *G05B 13/02* (2013.01); *H04B 1/0458* (2013.01)

(58) Field of Classification Search
None
See application file for complete search history.

(56) References Cited

U.S. PATENT DOCUMENTS 2,745,067 A 5/1956 True
3,117,279 A 1/1964 Ludvigson
(Continued)

FOREIGN PATENT DOCUMENTS

CN 101640949 A 2/2010
CN 201765685 U 3/2011
(Continued)

OTHER PUBLICATIONS

Bezooijen, A. et al., "A GSM/Edge/WCDMA Adaptive Series-LC Matching Network Using RF-MEMs Switches", IEEE Journal of Solid-State Circuits, vol. 43, No. 10, Oct. 2008, 2259-2268.
(Continued)

*Primary Examiner* — Ryan Jarrett
(74) *Attorney, Agent, or Firm* — Guntin & Gust, PLC; Ralph Trementozzi

(57) ABSTRACT

A system that incorporates teachings of the subject disclosure may include, for example, a process that assigns a respective priority level to each of a number of tuning algorithms controlling different tunable elements of a communication device. A first tuning algorithm is executed according to a first priority level assigned to the first tuning algorithm. A remaining number of the tuning algorithms are executed to determine whether the first tuning algorithm has affected a tuning state of any of the remainder of tuning algorithms. A second of the number of tuning algorithms is executed in response to a stability condition of the first tuning algorithm and according to a second priority level assigned to the second tuning algorithm. Other embodiments are disclosed.

20 Claims, 16 Drawing Sheets

(56) References Cited

U.S. PATENT DOCUMENTS

| | | |
|---|---|---|
| 3,160,832 A | 12/1964 | Beitman |
| 3,390,337 A | 6/1968 | Beitman |
| 3,443,231 A | 5/1969 | Roza |
| 3,509,500 A | 4/1970 | McNair |
| 3,571,716 A | 3/1971 | Hill |
| 3,590,385 A | 6/1971 | Sabo |
| 3,601,717 A | 8/1971 | Kuecken |
| 3,742,279 A | 6/1973 | Kupsky |
| 3,749,491 A | 7/1973 | Maxfield et al. |
| 3,794,941 A | 2/1974 | Templin |
| 3,919,644 A | 11/1975 | Smolka |
| 3,990,024 A | 11/1976 | Hou |
| 3,995,237 A | 11/1976 | Brunner |
| 4,186,359 A | 1/1980 | Kaegebein |
| 4,201,960 A | 5/1980 | Skutta |
| 4,227,256 A | 10/1980 | O'Keefe |
| 4,383,441 A | 5/1983 | Willis |
| 4,476,578 A | 10/1984 | Gaudin |
| 4,493,112 A | 1/1985 | Bruene |
| 4,509,019 A | 4/1985 | Banu et al. |
| 4,777,490 A | 10/1988 | Sharma |
| 4,799,066 A | 1/1989 | Deacon |
| 4,965,607 A | 10/1990 | Wilkins |
| 4,970,478 A | 11/1990 | Townley et al. |
| 4,980,656 A | 12/1990 | Duffalo |
| 5,032,805 A | 7/1991 | Elmer |
| 5,136,478 A | 8/1992 | Bruder |
| 5,142,255 A | 8/1992 | Chang |
| 5,177,670 A | 1/1993 | Shinohara |
| 5,195,045 A | 3/1993 | Keane |
| 5,200,826 A | 4/1993 | Seong |
| 5,212,463 A | 5/1993 | Babbitt |
| 5,216,392 A | 6/1993 | Fraser et al. |
| 5,230,091 A | 7/1993 | Vaisanen et al. |
| 5,243,358 A | 9/1993 | Sanford |
| 5,258,728 A | 11/1993 | Taniyoshi |
| 5,276,912 A | 1/1994 | Siwiak |
| 5,301,358 A | 4/1994 | Gaskill |
| 5,307,033 A | 4/1994 | Koscica |
| 5,310,358 A | 5/1994 | Johnson |
| 5,312,790 A | 5/1994 | Sengupta |
| 5,334,958 A | 8/1994 | Babbitt |
| 5,361,403 A | 11/1994 | Dent |
| 5,371,473 A | 12/1994 | Trinh |
| 5,409,889 A | 4/1995 | Das |
| 5,427,988 A | 6/1995 | Sengupta |
| 5,430,417 A | 7/1995 | Martin |
| 5,446,447 A | 8/1995 | Carney |
| 5,448,252 A | 9/1995 | Ali |
| 5,451,567 A | 9/1995 | Das |
| 5,451,914 A | 9/1995 | Stengel |
| 5,457,394 A | 10/1995 | McEwan |
| 5,472,935 A | 12/1995 | Yandrofski |
| 5,479,139 A | 12/1995 | Koscica |
| 5,486,491 A | 1/1996 | Sengupta |
| 5,496,795 A | 3/1996 | Das |
| 5,502,372 A | 3/1996 | Quan |
| 5,524,281 A | 6/1996 | Bradley |
| 5,548,837 A | 8/1996 | Hess et al. |
| 5,561,407 A | 10/1996 | Koscica |
| 5,564,086 A | 10/1996 | Cygan |
| 5,583,359 A | 12/1996 | Ng et al. |
| 5,589,844 A | 12/1996 | Belcher et al. |
| 5,593,495 A | 1/1997 | Masuda |
| 5,635,433 A | 6/1997 | Sengupta |
| 5,635,434 A | 6/1997 | Sengupta |
| 5,640,042 A | 6/1997 | Koscica |
| 5,679,624 A | 10/1997 | Das |
| 5,689,219 A | 11/1997 | Piirainen |
| 5,693,429 A | 12/1997 | Sengupta |
| 5,694,134 A | 12/1997 | Barnes |
| 5,699,071 A | 12/1997 | Urakami |
| 5,721,194 A | 2/1998 | Yandrofski |
| 5,766,697 A | 6/1998 | Sengupta |
| 5,777,581 A | 7/1998 | Lilly |
| 5,778,308 A | 7/1998 | Sroka |
| 5,786,727 A | 7/1998 | Sigmon |
| 5,812,572 A | 9/1998 | King |
| 5,812,943 A | 9/1998 | Suzuki |
| 5,830,591 A | 11/1998 | Sengupta |
| 5,846,893 A | 12/1998 | Sengupta |
| 5,874,926 A | 2/1999 | Tsuru |
| 5,880,635 A | 3/1999 | Satoh |
| 5,886,867 A | 3/1999 | Chivukula |
| 5,892,482 A | 4/1999 | Coleman et al. |
| 5,926,751 A | 7/1999 | Vlahos et al. |
| 5,929,717 A | 7/1999 | Richardson |
| 5,940,030 A | 8/1999 | Hampel et al. |
| 5,963,871 A | 10/1999 | Zhinong |
| 5,969,582 A | 10/1999 | Boesch |
| 5,982,099 A | 11/1999 | Barnes et al. |
| 5,990,766 A | 11/1999 | Zhang |
| 6,009,124 A | 12/1999 | Smith |
| 6,020,787 A | 2/2000 | Kim |
| 6,020,795 A | 2/2000 | Kim |
| 6,029,075 A | 2/2000 | Das |
| 6,045,932 A | 4/2000 | Jia |
| 6,061,025 A | 5/2000 | Jackson |
| 6,064,865 A | 5/2000 | Kuo et al. |
| 6,074,971 A | 6/2000 | Chiu |
| 6,096,127 A | 8/2000 | Dimos |
| 6,100,733 A | 8/2000 | Dortu |
| 6,101,102 A | 8/2000 | Brand |
| 6,115,585 A | 9/2000 | Matero |
| 6,125,266 A | 9/2000 | Matero et al. |
| 6,133,883 A | 10/2000 | Munson |
| 6,172,385 B1 | 1/2001 | Duncombe |
| 6,215,644 B1 | 4/2001 | Dhuler |
| 6,242,989 B1 | 6/2001 | Barber |
| 6,266,528 B1 | 7/2001 | Farzaneh |
| 6,281,748 B1 | 8/2001 | Klomsdorf et al. |
| 6,281,847 B1 | 8/2001 | Lee |
| 6,309,895 B1 | 10/2001 | Jaing |
| 6,343,208 B1 | 1/2002 | Ying |
| 6,377,142 B1 | 4/2002 | Chiu |
| 6,377,217 B1 | 4/2002 | Zhu |
| 6,377,440 B1 | 4/2002 | Zhu |
| 6,384,785 B1 | 5/2002 | Kamogawa |
| 6,404,614 B1 | 6/2002 | Zhu |
| 6,408,190 B1 | 6/2002 | Ying |
| 6,414,562 B1 | 7/2002 | Bouisse |
| 6,415,562 B1 | 7/2002 | Donaghue |
| 6,452,776 B1 | 9/2002 | Chakravorty |
| 6,461,930 B2 | 10/2002 | Akram |
| 6,466,774 B1 | 10/2002 | Okabe |
| 6,492,883 B2 | 12/2002 | Liang |
| 6,514,895 B1 | 2/2003 | Chiu |
| 6,525,630 B1 | 2/2003 | Zhu |
| 6,531,936 B1 | 3/2003 | Chiu |
| 6,535,076 B2 | 3/2003 | Partridge |
| 6,535,722 B1 | 3/2003 | Rosen |
| 6,538,603 B1 | 3/2003 | Chen |
| 6,556,102 B1 | 4/2003 | Sengupta |
| 6,556,814 B1 | 4/2003 | Klomsdorf |
| 6,570,462 B2 | 5/2003 | Edmonson |
| 6,590,468 B2 | 7/2003 | du Toit |
| 6,590,541 B1 | 7/2003 | Schultze |
| 6,597,265 B2 | 7/2003 | Liang |
| 6,608,603 B2 | 8/2003 | Alexopoulos |
| 6,624,786 B2 | 9/2003 | Boyle |
| 6,640,085 B1 | 10/2003 | Chatzipetros |
| 6,657,595 B1 | 12/2003 | Phillips |
| 6,661,638 B2 | 12/2003 | Jackson |
| 6,670,256 B2 | 12/2003 | Yang |
| 6,710,651 B2 | 3/2004 | Forrester |
| 6,724,611 B1 | 4/2004 | Mosley |
| 6,724,890 B1 | 4/2004 | Bareis |
| 6,737,179 B2 | 5/2004 | Sengupta |
| 6,747,522 B2 | 6/2004 | Pietruszynski et al. |
| 6,759,918 B2 | 7/2004 | Du Toit |
| 6,765,540 B2 | 7/2004 | Toncich |
| 6,768,472 B2 | 7/2004 | Alexopoulos |
| 6,774,077 B2 | 8/2004 | Sengupta |
| 6,795,712 B1 | 9/2004 | Vakilian |

(56) References Cited

U.S. PATENT DOCUMENTS

| | | |
|---|---|---|
| 6,825,818 B2 | 11/2004 | Toncich |
| 6,839,028 B2 | 1/2005 | Lee |
| 6,845,126 B2 | 1/2005 | Dent |
| 6,859,104 B2 | 2/2005 | Toncich |
| 6,862,432 B1 | 3/2005 | Kim |
| 6,864,757 B2 | 3/2005 | Du Toit |
| 6,868,260 B2 | 3/2005 | Jagielski |
| 6,875,655 B2 | 4/2005 | Lin |
| 6,882,245 B2 | 4/2005 | Utsunomiya |
| 6,888,714 B2 | 5/2005 | Shaw |
| 6,905,989 B2 | 6/2005 | Ellis |
| 6,906,653 B2 | 6/2005 | Uno |
| 6,907,234 B2 | 6/2005 | Karr |
| 6,914,487 B1 | 7/2005 | Doyle et al. |
| 6,920,315 B1 | 7/2005 | Wilcox et al. |
| 6,922,330 B2 | 7/2005 | Nielsen |
| 6,943,078 B1 | 9/2005 | Zheng |
| 6,946,847 B2 | 9/2005 | Nishimori |
| 6,949,442 B2 | 9/2005 | Barth |
| 6,961,368 B2 | 11/2005 | Dent |
| 6,964,296 B2 | 11/2005 | Memory |
| 6,965,837 B2 | 11/2005 | Vintola |
| 6,987,493 B2 | 1/2006 | Chen |
| 6,993,297 B2 | 1/2006 | Smith |
| 6,999,297 B1 | 2/2006 | Klee |
| 7,009,455 B2 | 3/2006 | Toncich |
| 7,071,776 B2 | 7/2006 | Forrester |
| 7,106,715 B1 | 9/2006 | Kelton |
| 7,107,033 B2 | 9/2006 | Du Toit |
| 7,113,614 B2 | 9/2006 | Rhoads |
| 7,151,411 B2 | 12/2006 | Martin |
| 7,176,634 B2 | 2/2007 | Kitamura |
| 7,176,845 B2 | 2/2007 | Fabrega-Sanchez |
| 7,180,467 B2 | 2/2007 | Fabrega-Sanchez |
| 7,221,327 B2 | 5/2007 | Toncich |
| 7,298,329 B2 | 11/2007 | Diament |
| 7,299,018 B2 | 11/2007 | Van Rumpt |
| 7,312,118 B2 | 12/2007 | Kiyotoshi |
| 7,332,980 B2 | 2/2008 | Zhu |
| 7,332,981 B2 | 2/2008 | Matsuno |
| 7,339,527 B2 | 3/2008 | Sager |
| 7,369,828 B2 | 5/2008 | Shamsaifar |
| 7,426,373 B2 | 9/2008 | Clingman |
| 7,427,949 B2 | 9/2008 | Channabasappa et al. |
| 7,453,405 B2 | 11/2008 | Nishikido et al. |
| 7,468,638 B1 | 12/2008 | Tsai |
| 7,469,129 B2 | 12/2008 | Blaker et al. |
| 7,528,674 B2 | 5/2009 | Kato et al. |
| 7,531,011 B2 | 5/2009 | Yamasaki |
| 7,535,080 B2 | 5/2009 | Zeng et al. |
| 7,535,312 B2 | 5/2009 | McKinzie |
| 7,539,527 B2 | 5/2009 | Jang |
| 7,557,507 B2 | 7/2009 | Wu |
| 7,596,357 B2 | 9/2009 | Nakamata |
| 7,633,355 B2 | 12/2009 | Matsuo |
| 7,642,879 B2 | 1/2010 | Matsuno |
| 7,655,530 B2 | 2/2010 | Hosking |
| 7,667,663 B2 | 2/2010 | Hsiao |
| 7,671,693 B2 | 3/2010 | Brobston et al. |
| 7,705,692 B2 | 4/2010 | Fukamachi et al. |
| 7,711,337 B2 | 5/2010 | McKinzie |
| 7,714,676 B2 | 5/2010 | McKinzie |
| 7,714,678 B2 | 5/2010 | du Toit et al. |
| 7,728,693 B2 | 6/2010 | du Toit et al. |
| 7,760,699 B1 | 7/2010 | Malik |
| 7,768,400 B2 | 8/2010 | Lawrence et al. |
| 7,786,819 B2 | 8/2010 | Ella |
| 7,795,990 B2 | 9/2010 | du Toit |
| 7,830,320 B2 | 11/2010 | Shamblin et al. |
| 7,852,170 B2 | 12/2010 | McKinzie |
| 7,856,228 B2 | 12/2010 | Lekutai et al. |
| 7,865,154 B2 | 1/2011 | Mendolia |
| 7,907,094 B2 | 3/2011 | Kakitsu et al. |
| 7,917,104 B2 | 3/2011 | Manssen et al. |
| 7,949,309 B2 | 5/2011 | Rofougaran |
| 7,969,257 B2 | 6/2011 | du Toit |
| 7,983,615 B2 | 7/2011 | Bryce et al. |
| 7,991,363 B2 | 8/2011 | Greene |
| 8,008,982 B2 | 8/2011 | McKinzie |
| 8,072,285 B2 | 12/2011 | Spears |
| 8,112,043 B2 | 2/2012 | Knudsen et al. |
| 8,170,510 B2 | 5/2012 | Knudsen et al. |
| 8,190,109 B2 | 5/2012 | Ali et al. |
| 8,204,446 B2 | 6/2012 | Scheer |
| 8,213,886 B2 | 7/2012 | Blin |
| 8,217,731 B2 | 7/2012 | McKinzie et al. |
| 8,217,732 B2 | 7/2012 | McKinzie |
| 8,299,867 B2 | 10/2012 | McKinzie |
| 8,320,850 B1 | 11/2012 | Khlat |
| 8,325,097 B2 | 12/2012 | McKinzie, III et al. |
| 8,405,563 B2 | 3/2013 | McKinzie et al. |
| 8,421,548 B2 | 4/2013 | Spears et al. |
| 8,432,234 B2 | 4/2013 | Manssen et al. |
| 8,442,457 B2 | 5/2013 | Harel et al. |
| 8,457,569 B2 | 6/2013 | Blin |
| 8,472,888 B2 | 6/2013 | Manssen et al. |
| 8,543,123 B2 | 9/2013 | Moon et al. |
| 8,543,176 B1 | 9/2013 | Daniel et al. |
| 8,558,633 B2 | 10/2013 | McKinzie, III |
| 8,564,381 B2 | 10/2013 | McKinzie |
| 8,594,584 B2 | 11/2013 | Greene et al. |
| 8,620,236 B2 | 12/2013 | Manssen et al. |
| 8,620,246 B2 | 12/2013 | McKinzie et al. |
| 8,620,247 B2 | 12/2013 | McKinzie et al. |
| 8,655,286 B2 | 2/2014 | Mendolia |
| 8,674,783 B2 | 3/2014 | Spears et al. |
| 8,680,934 B2 | 3/2014 | McKinzie et al. |
| 8,693,963 B2 | 4/2014 | du Toit et al. |
| 8,712,340 B2 | 4/2014 | Hoirup et al. |
| 8,774,743 B2 | 7/2014 | Ali et al. |
| 8,787,845 B2 | 7/2014 | Manssen et al. |
| 8,803,631 B2 | 8/2014 | Greene et al. |
| 8,860,525 B2 | 10/2014 | Spears et al. |
| 8,948,889 B2 * | 2/2015 | Manssen ............. G05B 13/02 455/77 |
| 8,957,742 B2 | 2/2015 | Spears et al. |
| 9,026,062 B2 | 5/2015 | Greene et al. |
| 9,119,152 B2 | 8/2015 | Blin |
| 2002/0008672 A1 | 1/2002 | Gothard et al. |
| 2002/0030566 A1 | 3/2002 | Bozler |
| 2002/0079982 A1 | 6/2002 | Lafleur et al. |
| 2002/0109642 A1 | 8/2002 | Gee et al. |
| 2002/0118075 A1 | 8/2002 | Ohwada |
| 2002/0145483 A1 | 10/2002 | Bouisse |
| 2002/0167963 A1 | 11/2002 | Joa-Ng |
| 2002/0183013 A1 | 12/2002 | Auckland et al. |
| 2002/0187780 A1 | 12/2002 | Souissi |
| 2002/0191703 A1 | 12/2002 | Ling |
| 2002/0193088 A1 | 12/2002 | Jung |
| 2003/0060227 A1 | 3/2003 | Sekine |
| 2003/0071300 A1 | 4/2003 | Yashima |
| 2003/0114124 A1 | 6/2003 | Higuchi |
| 2003/0142022 A1 | 7/2003 | Ollikainen |
| 2003/0184319 A1 | 10/2003 | Nishimori et al. |
| 2003/0193997 A1 | 10/2003 | Dent |
| 2003/0199286 A1 | 10/2003 | D du Toit |
| 2003/0210206 A1 | 11/2003 | Phillips |
| 2003/0216150 A1 | 11/2003 | Ueda |
| 2003/0232607 A1 | 12/2003 | Le Bars |
| 2004/0009754 A1 | 1/2004 | Smith |
| 2004/0090372 A1 | 5/2004 | Nallo |
| 2004/0100341 A1 | 5/2004 | Luetzelschwab |
| 2004/0127178 A1 | 7/2004 | Kuffner |
| 2004/0137950 A1 | 7/2004 | Bolin |
| 2004/0202399 A1 | 10/2004 | Kochergin |
| 2004/0204027 A1 | 10/2004 | Park et al. |
| 2004/0227176 A1 | 11/2004 | York |
| 2004/0232982 A1 | 11/2004 | Itchitsubo et al. |
| 2004/0257293 A1 | 12/2004 | Friedrich |
| 2004/0263411 A1 | 12/2004 | Fabrega-Sanchez et al. |
| 2004/0264610 A1 | 12/2004 | Marro et al. |
| 2005/0007291 A1 | 1/2005 | Fabrega-Sanchez |
| 2005/0032488 A1 | 2/2005 | Pehlke |
| 2005/0032541 A1 | 2/2005 | Wang |

(56) References Cited

U.S. PATENT DOCUMENTS

| | | |
|---|---|---|
| 2005/0042994 A1 | 2/2005 | Otaka |
| 2005/0059362 A1 | 3/2005 | Kalajo |
| 2005/0082636 A1 | 4/2005 | Yashima |
| 2005/0085204 A1 | 4/2005 | Poilasne et al. |
| 2005/0093624 A1 | 5/2005 | Forrester et al. |
| 2005/0130608 A1 | 6/2005 | Forse |
| 2005/0130699 A1 | 6/2005 | Kim |
| 2005/0208960 A1 | 9/2005 | Hassan |
| 2005/0215204 A1 | 9/2005 | Wallace |
| 2005/0227627 A1 | 10/2005 | Cyr et al. |
| 2005/0227633 A1 | 10/2005 | Dunko |
| 2005/0259011 A1 | 11/2005 | Vance |
| 2005/0260962 A1 | 11/2005 | Nazrul et al. |
| 2005/0264455 A1 | 12/2005 | Talvitie |
| 2005/0280588 A1 | 12/2005 | Fujikawa et al. |
| 2005/0282503 A1 | 12/2005 | Onno |
| 2006/0003537 A1 | 1/2006 | Sinha |
| 2006/0009165 A1 | 1/2006 | Alles |
| 2006/0030277 A1 | 2/2006 | Cyr et al. |
| 2006/0077082 A1 | 4/2006 | Shanks et al. |
| 2006/0099915 A1 | 5/2006 | Laroia et al. |
| 2006/0099952 A1 | 5/2006 | Prehofer et al. |
| 2006/0119511 A1 | 6/2006 | Collinson et al. |
| 2006/0148415 A1 | 7/2006 | Hamalainen et al. |
| 2006/0160501 A1 | 7/2006 | Mendolia |
| 2006/0183431 A1 | 8/2006 | Chang et al. |
| 2006/0183433 A1 | 8/2006 | Mori et al. |
| 2006/0183442 A1 | 8/2006 | Chang et al. |
| 2006/0195161 A1 | 8/2006 | Li et al. |
| 2006/0205368 A1 | 9/2006 | Bustamante |
| 2006/0281423 A1 | 12/2006 | Caimi |
| 2007/0001924 A1 | 1/2007 | Hirabayashi et al. |
| 2007/0013483 A1 | 1/2007 | Stewart |
| 2007/0035458 A1 | 2/2007 | Ohba et al. |
| 2007/0042725 A1 | 2/2007 | Poilasne |
| 2007/0042734 A1 | 2/2007 | Ryu |
| 2007/0063788 A1 | 3/2007 | Zhu |
| 2007/0077956 A1 | 4/2007 | Julian et al. |
| 2007/0080888 A1 | 4/2007 | Mohamadi |
| 2007/0082611 A1 | 4/2007 | Terranova et al. |
| 2007/0085609 A1 | 4/2007 | Itkin |
| 2007/0091006 A1 | 4/2007 | Thober et al. |
| 2007/0093282 A1 | 4/2007 | Chang et al. |
| 2007/0111681 A1 | 5/2007 | Alberth et al. |
| 2007/0121267 A1 | 5/2007 | Kotani et al. |
| 2007/0142011 A1 | 6/2007 | Shatara |
| 2007/0142014 A1 | 6/2007 | Wilcox |
| 2007/0149146 A1 | 6/2007 | Hwang |
| 2007/0171879 A1 | 7/2007 | Bourque |
| 2007/0182636 A1 | 8/2007 | Carlson |
| 2007/0184825 A1 | 8/2007 | Lim et al. |
| 2007/0194859 A1 | 8/2007 | Brobston |
| 2007/0197180 A1 | 8/2007 | McKinzie et al. |
| 2007/0200766 A1 | 8/2007 | McKinzie |
| 2007/0200773 A1 | 8/2007 | Dou et al. |
| 2007/0210899 A1 | 9/2007 | Kato et al. |
| 2007/0248238 A1 | 10/2007 | Abreu et al. |
| 2007/0285326 A1 | 12/2007 | McKinzie |
| 2007/0293176 A1 | 12/2007 | Yu |
| 2008/0007478 A1 | 1/2008 | Jung |
| 2008/0018541 A1 | 1/2008 | Pang |
| 2008/0030165 A1 | 2/2008 | Lisac et al. |
| 2008/0055016 A1 | 3/2008 | Morris |
| 2008/0055168 A1 | 3/2008 | Massey et al. |
| 2008/0081670 A1 | 4/2008 | Rofougaran |
| 2008/0090539 A1 | 4/2008 | Thompson |
| 2008/0094149 A1 | 4/2008 | Brobston |
| 2008/0106350 A1 | 5/2008 | McKinzie |
| 2008/0111748 A1 | 5/2008 | Dunn et al. |
| 2008/0122553 A1 | 5/2008 | McKinzie |
| 2008/0122723 A1 | 5/2008 | Rofougaran |
| 2008/0129612 A1 | 6/2008 | Wang |
| 2008/0158076 A1 | 7/2008 | Walley |
| 2008/0174508 A1 | 7/2008 | Iwai et al. |
| 2008/0261544 A1 | 10/2008 | Blin et al. |
| 2008/0274706 A1 | 11/2008 | Blin |
| 2008/0280570 A1 | 11/2008 | Blin |
| 2008/0285729 A1 | 11/2008 | Glasgow et al. |
| 2008/0288028 A1 | 11/2008 | Larson et al. |
| 2008/0294718 A1 | 11/2008 | Okano |
| 2008/0300027 A1 | 12/2008 | Dou et al. |
| 2008/0305749 A1 | 12/2008 | Ben-Bassat |
| 2008/0305750 A1 | 12/2008 | Alon et al. |
| 2008/0309617 A1 | 12/2008 | Kong et al. |
| 2009/0002077 A1 | 1/2009 | Rohani et al. |
| 2009/0027286 A1 | 1/2009 | Ohishi |
| 2009/0039976 A1 | 2/2009 | McKinzie, III |
| 2009/0051611 A1 | 2/2009 | Shamblin et al. |
| 2009/0082017 A1 | 3/2009 | Chang et al. |
| 2009/0109880 A1 | 4/2009 | Kim et al. |
| 2009/0121963 A1 | 5/2009 | Greene |
| 2009/0149136 A1 | 6/2009 | Rofougaran |
| 2009/0180403 A1 | 7/2009 | Tudosoiu |
| 2009/0184879 A1 | 7/2009 | Derneryd |
| 2009/0196192 A1 | 8/2009 | Lim et al. |
| 2009/0215446 A1 | 8/2009 | Hapsari et al. |
| 2009/0231220 A1 | 9/2009 | Zhang et al. |
| 2009/0253385 A1 | 10/2009 | Dent et al. |
| 2009/0264065 A1 | 10/2009 | Song |
| 2009/0278685 A1 | 11/2009 | Potyrailo |
| 2009/0295651 A1 | 12/2009 | Dou et al. |
| 2009/0323572 A1 | 12/2009 | Shi et al. |
| 2009/0323582 A1 | 12/2009 | Proctor et al. |
| 2010/0041348 A1 | 2/2010 | Wilcox et al. |
| 2010/0053009 A1 | 3/2010 | Rofougaran |
| 2010/0060531 A1 | 3/2010 | Rappaport |
| 2010/0073103 A1 | 3/2010 | Spears et al. |
| 2010/0085260 A1 | 4/2010 | McKinzie |
| 2010/0085884 A1 | 4/2010 | Srinivasan et al. |
| 2010/0105425 A1 | 4/2010 | Asokan |
| 2010/0107067 A1 | 4/2010 | Vaisanen et al. |
| 2010/0134215 A1 | 6/2010 | Lee et al. |
| 2010/0156552 A1 | 6/2010 | McKinzie |
| 2010/0164640 A1 | 7/2010 | McKinzie |
| 2010/0164641 A1 | 7/2010 | McKinzie |
| 2010/0214189 A1 | 8/2010 | Kanazawa |
| 2010/0232474 A1 | 9/2010 | Rofougaran |
| 2010/0244576 A1 | 9/2010 | Hillan et al. |
| 2010/0277363 A1 | 11/2010 | Kainulainen et al. |
| 2010/0285836 A1 | 11/2010 | Horihata et al. |
| 2010/0302106 A1 | 12/2010 | Knudsen et al. |
| 2010/0304684 A1 | 12/2010 | Duron et al. |
| 2010/0304688 A1 | 12/2010 | Knudsen |
| 2011/0002080 A1 | 1/2011 | Ranta |
| 2011/0012790 A1 | 1/2011 | Badaruzzaman |
| 2011/0014879 A1 | 1/2011 | Alberth et al. |
| 2011/0014886 A1 | 1/2011 | Manssen |
| 2011/0019606 A1 | 1/2011 | Umeda et al. |
| 2011/0026415 A1 | 2/2011 | Kamuf et al. |
| 2011/0039504 A1 | 2/2011 | Nguyen et al. |
| 2011/0043298 A1 | 2/2011 | McKinzie |
| 2011/0043328 A1 | 2/2011 | Bassali |
| 2011/0053524 A1 | 3/2011 | Manssen |
| 2011/0063042 A1 | 3/2011 | Mendolia |
| 2011/0086600 A1 | 4/2011 | Muhammad |
| 2011/0086630 A1 | 4/2011 | Manssen |
| 2011/0102290 A1 | 5/2011 | Milosavljevic |
| 2011/0105023 A1 | 5/2011 | Scheer et al. |
| 2011/0116395 A1 | 5/2011 | Tsuda et al. |
| 2011/0116423 A1 | 5/2011 | Rousu et al. |
| 2011/0117863 A1 | 5/2011 | Camp, Jr. et al. |
| 2011/0117973 A1 | 5/2011 | Asrani et al. |
| 2011/0121079 A1 | 5/2011 | Lawrence et al. |
| 2011/0122040 A1 | 5/2011 | Wakabayashi et al. |
| 2011/0133994 A1 | 6/2011 | Korva |
| 2011/0140982 A1 | 6/2011 | Ozden et al. |
| 2011/0183628 A1 | 7/2011 | Baker |
| 2011/0183633 A1 | 7/2011 | Obha |
| 2011/0195679 A1 | 8/2011 | Lee et al. |
| 2011/0227666 A1 | 9/2011 | Manssen |
| 2011/0237207 A1 | 9/2011 | Bauder |
| 2011/0249760 A1 | 10/2011 | Chrisikos et al. |
| 2011/0250852 A1 | 10/2011 | Greene |
| 2011/0254637 A1 | 10/2011 | Manssen |

(56) References Cited

U.S. PATENT DOCUMENTS

| | | |
|---|---|---|
| 2011/0254638 A1 | 10/2011 | Manssen |
| 2011/0256857 A1 | 10/2011 | Chen et al. |
| 2011/0281532 A1 | 11/2011 | Shin et al. |
| 2011/0299438 A1 | 12/2011 | Mikhemar |
| 2011/0306310 A1 | 12/2011 | Bai |
| 2011/0309980 A1 | 12/2011 | Ali et al. |
| 2012/0039189 A1 | 2/2012 | Suzuki et al. |
| 2012/0051409 A1 | 3/2012 | Brobston et al. |
| 2012/0062431 A1 | 3/2012 | Tikka et al. |
| 2012/0075159 A1 | 3/2012 | Chang |
| 2012/0084537 A1 | 4/2012 | Indukuru |
| 2012/0094708 A1 | 4/2012 | Park |
| 2012/0099462 A1 | 4/2012 | Yuda et al. |
| 2012/0100802 A1 | 4/2012 | Mohebbi |
| 2012/0112851 A1 | 5/2012 | Manssen |
| 2012/0112852 A1 | 5/2012 | Manssen et al. |
| 2012/0119843 A1 | 5/2012 | du Toit et al. |
| 2012/0119844 A1 | 5/2012 | du Toit et al. |
| 2012/0139810 A1 | 6/2012 | Faraone et al. |
| 2012/0154975 A1 | 6/2012 | Oakes |
| 2012/0214421 A1 | 8/2012 | Hoirup |
| 2012/0220243 A1 | 8/2012 | Mendolia |
| 2012/0243579 A1 | 9/2012 | Premakanthan et al. |
| 2012/0286586 A1 | 11/2012 | Balm |
| 2012/0293384 A1 | 11/2012 | Knudsen et al. |
| 2012/0295554 A1 | 11/2012 | Greene |
| 2012/0295555 A1 | 11/2012 | Greene et al. |
| 2012/0309332 A1 | 12/2012 | Liao et al. |
| 2013/0005277 A1 | 1/2013 | Klomsdorf et al. |
| 2013/0052967 A1 | 2/2013 | Black et al. |
| 2013/0056841 A1 | 3/2013 | Hsieh et al. |
| 2013/0076579 A1 | 3/2013 | Zhang et al. |
| 2013/0076580 A1 | 3/2013 | Zhang et al. |
| 2013/0106332 A1 | 5/2013 | Williams et al. |
| 2013/0122829 A1 | 5/2013 | Hyvonen et al. |
| 2013/0137384 A1 | 5/2013 | Desclos et al. |
| 2013/0154897 A1 | 6/2013 | Sorensen et al. |
| 2013/0182583 A1 | 7/2013 | Siomina et al. |
| 2013/0194054 A1 | 8/2013 | Presti |
| 2013/0215846 A1 | 8/2013 | Yerrabommanahalli et al. |
| 2013/0231155 A1 | 9/2013 | Sheynman et al. |
| 2013/0265912 A1 | 10/2013 | Ikonen et al. |
| 2013/0293425 A1 | 11/2013 | Zhu et al. |
| 2013/0315285 A1 | 11/2013 | Black et al. |
| 2014/0002323 A1 | 1/2014 | Ali et al. |
| 2014/0009360 A1 | 1/2014 | Ikonen et al. |
| 2014/0162572 A1 | 6/2014 | Hirabayashi |
| 2014/0210686 A1 | 7/2014 | Ali et al. |
| 2014/0287698 A1 | 9/2014 | Ali et al. |
| 2016/0241276 A1 | 8/2016 | Zhu |
| 2016/0269055 A1 | 9/2016 | Greene et al. |
| 2016/0277129 A1 | 9/2016 | Manssen |
| 2016/0322991 A1 | 11/2016 | McKinzie |
| 2016/0336916 A1 | 11/2016 | Du Toit et al. |

FOREIGN PATENT DOCUMENTS

| | | |
|---|---|---|
| DE | 19614655 | 10/1997 |
| DE | 102008050743 | 4/2010 |
| DE | 102009018648 A1 | 10/2010 |
| EM | EP0909024 | 4/1999 |
| EP | 0685936 | 6/1995 |
| EP | 0909024 | 4/1999 |
| EP | 1079296 | 2/2001 |
| EP | 1137192 | 9/2001 |
| EP | 1298810 | 4/2006 |
| EP | 2214085 A2 | 8/2010 |
| EP | 2328233 | 6/2011 |
| EP | 2388925 A1 | 11/2011 |
| EP | 2424119 A1 | 2/2012 |
| EP | 2638640 A4 | 7/2014 |
| JP | 03276901 | 3/1990 |
| JP | 02-077580 | 9/1991 |
| JP | 9321526 | 12/1997 |
| JP | 10209722 | 8/1998 |
| JP | 2000124066 | 4/2000 |
| JP | 2005-130441 | 5/2005 |
| KR | 100645526 | 11/2006 |
| KR | 10-0740177 | 7/2007 |
| WO | 01/71846 | 9/2001 |
| WO | 2006/031170 | 3/2006 |
| WO | 2008/030165 | 3/2008 |
| WO | 2009/064968 | 5/2009 |
| WO | 2009/108391 A1 | 9/2009 |
| WO | 2009/155966 | 12/2009 |
| WO | 2010028521 A1 | 3/2010 |
| WO | 2010121914 A1 | 10/2010 |
| WO | 2011/044592 | 4/2011 |
| WO | 2011/084716 | 7/2011 |
| WO | 2011084716 A1 | 7/2011 |
| WO | 2011102143 A1 | 8/2011 |
| WO | 2011/133657 | 10/2011 |
| WO | 2011028453 | 10/2011 |
| WO | 2012/067622 | 5/2012 |
| WO | 2012/085932 | 6/2012 |
| WO | 2012085932 A2 | 6/2012 |

OTHER PUBLICATIONS

Du Toit, , "Tunable Microwave Devices With Auto Adjusting Matching Circuit", U.S. Appl. No. 13/302,617, filed Nov. 22, 2011.
Du Toit, , "Tunable Microwave Devices With Auto-Adjusting Matching Circuit", U.S. Appl. No. 13/302,649, filed Nov. 22, 2011.
Eiji, N. , "High-Frequency Circuit and Its Manufacture", Patent Abstracts of Japan, vol. 1998, No. 13, Nov. 30, 1998 & JP 10 209722 A (Seiko Epson Corp), Aug. 7, 1998.
Greene, , "Method and Apparatus for Tuning a Communication Device", U.S. Appl. No. 13/108,463, filed May 16, 2011.
Greene, , "Method and Apparatus for Tuning a Communication Device", U.S. Appl. No. 13/108,589, filed May 16, 2011.
Hoirup, , "Method and Apparatus for Radio Antenna Frequency Tuning", U.S. Appl. No. 13/030,177, filed Feb. 18, 2011.
Huang, Libo et al., "Theoretical and experimental investigation of adaptive antenna impedance matching for multiband mobile phone applications", IEEE, Sep. 7, 2005, 13-17.
Hyun, S. , "Effects of strain on the dielectric properties of tunable dielectric SrTiO3 thin films", Applied Physics Letters, vol. 79, No. 2, Jul. 9, 2001.
Ida, I. et al., "An Adaptive Impedance Matching System and Its Application to Mobile Antennas", TENCON 2004, IEEE Region 10 Conference, See Abstract ad p. 544, Nov. 21-24, 2004, 543-547.
Katsuya, K. , "Hybrid Integrated Circuit Device", Patent Abstracts of Japan, Publication No. 03-276901, Date of publication of application: Sep. 12, 1991.
Manssen, , "Method and Apparatus for Managing Interference in a Communication Device", U.S. Appl. No. 61/326,206, filed Apr. 20, 2010.
Manssen, , "Method and Apparatus for Tuning Antennas in a Communication Device", U.S. Appl. No. 12/941,972, filed Nov. 8, 2010.
Manssen, , "Method and Apparatus for Tuning Antennas in a Communication Device", U.S. Appl. No. 13/005,122, filed Jan. 12, 2011.
McKinzie, , "Adaptive Impedance Matching Module (AIMM) Control Architectures", U.S. Appl. No. 13/293,544, filed Nov. 10, 2011.
McKinzie, "Adaptive Impedance Matching Module (AIMM) Control Architectures", U.S. Appl. No. 13/293,550, filed Nov. 10, 2011.
McKinzie, "Method and Apparatus for Adaptive Impedance Matching", U.S. Appl. No. 13/217,748, filed Aug. 25, 2011.
Mendolia, "Method and Apparatus for Tuning a Communication Device", U.S. Appl. No. 13/035,417, filed Feb. 25, 2011.
Paratek Microwave, Inc., "Method and Appartus for Tuning Antennas in a Communication Device", International Application No. PCT/US11/59620; Filed Nov. 7, 2011.
Patent Cooperation Treaty, "International Search Report and Written Opinion", International Application No. PCT/US2010/046241, Mar. 2, 2011.

(56) References Cited

OTHER PUBLICATIONS

Patent Cooperation Treaty, "International Search Report and Written Opinion", International Application No. PCT/US2010/056413, Jul. 27, 2011.

Patent Cooperation Treaty, "International Search Report and Written Opinion", Nov. 16, 2011, International Application No. PCT/US/2011/038543.

Patent Cooperation Treaty, "International Search Report and Written Opinion", PCT Application No. PCT/US08/005085, Jul. 2, 2008.

Payandehjoo, Kasra et al., "Investigation of Parasitic Elements for Coupling Reduction in MultiAntenna Hand-Set Devices", Published online Jan. 22, 2013 in Wiley Online Library (wileyonlinelibrary.com).

Pervez, N.K., "High Tunability barium strontium titanate thin films for RF circuit applications", Applied Physics Letters, vol. 85, No. 19, Nov. 8, 2004.

Petit, Laurent , "MEMS-Switched Parasitic-Antenna Array for Radiation Pattern Diversity", IEEE Transactions on Antennas and Propagation, vol. 54, No. 9, Sep. 2009, 2624-2631.

Qiao, et al., "Antenna Impedance Mismatch Measurement and Correction for Adaptive COMA Transceivers", IEEE, Jan. 2005.

Qiao, et al., "Measurement of Antenna Load Impedance for Power Amplifiers", The Department of Electrical and Computer Engineering, University of California, San Diego, Sep. 13, 2004.

Spears, "Methods for Tuning an Adaptive Impedance Matching Network With a Look-Up Table", U.S. Appl. No. 13/297,951, filed Nov. 16, 2011.

Stemmer, Susanne, "Low-loss tunable capacitors fabricated directly on gold bottom electrodes", Applied Physics Letters 88, 112905, Mar. 15, 2006.

Taylor, T.R., "Impact of thermal strain on the dielectric constant of sputtered barium strontium titanate thin films", Applied Physics Letters, vol. 80, No. 11, Mar. 18, 2002.

Tombak, Ali , "Tunable Barium Strontium Titanate Thin Film Capacitors for RF and Microwave Applications", IEEE Microwave and Wireles Components Letters, vol. 12, Jan. 2002.

Xu, Hongtao , "Tunable Microwave Integrated Circuits using BST Thin Film Capacitors with Device", Integrated Ferroelectrics, Department of Electrical Engineering and Computer Engineering, University of California, 2005, Apr. 2005.

Zuo, S., "Eigenmode Decoupling for Mimo Loop-Antenna Based on 180 Coupler", Progress in Electromagnetics Research Letters, vol. 26, Aug. 2011, 11-20.

Canadian Office Action, Application No. 2,821,173, Oct. 17, 2016.

"European Search Report", 16151299.1 search report, 2016.

"Extended European Search Report", EP Application No. 16155235.1, May 3, 2016.

"Search Report", ROC (Taiwan) Patent Application No. 101117467, English Translation, Apr. 12, 2016, 1 page.

\* cited by examiner

100

200

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| ⋮ |
| Band N; Use Case 1; Desired tuning state |
| Band N; Use Case 2; Desired tuning state |
| ⋮ |
| Band N; Use Case n; Desired tuning state |

METHODS AND APPARATUS FOR TUNING CIRCUIT COMPONENTS OF A COMMUNICATION DEVICE

CROSS-REFERENCE TO RELATED APPLICATION(S)

This application is a continuation of U.S. patent application Ser. No. 13/486,914 filed Jun. 1, 2012, scheduled to issue on Feb. 3, 2015, as U.S. Pat. No. 8,948,889, by Keith Manssen et al., entitled "Methods and Apparatus for Tuning Circuit Components of a Communication Device." All sections of the aforementioned application(s) are incorporated herein by reference in its entirety.

FIELD OF THE DISCLOSURE

The subject disclosure relates to methods and apparatus for tuning circuit components of a communication device.

BACKGROUND

Cellular telephone devices have migrated to support multi-cellular access technologies, peer-to-peer access technologies, personal area network access technologies, and location receiver access technologies, which can operate concurrently. Cellular telephone devices in the form of smartphones have also integrated a variety of consumer features such as MP3 players, color displays, gaming applications, cameras, and other features. Cellular telephone devices can be required to communicate at a variety of frequencies, and in some instances are subjected to a variety of physical and function use conditions.

These and other factors can result in a need for tunability of more than one circuit component of a transceiver. For example, tunable circuits can be used to adjust an impedance match of an antenna over a frequency range to improve output power. Difficulties, however, can arise when attempting to tune the matching circuit for signal reception. Tunable circuits can also be used with amplifiers and filters. Additionally, tuning circuits can be placement on a radiating element of an antenna to enable on-antenna tuning. By combining more than one tuning technique in a single communication device, multiple tuning algorithms may be required.

BRIEF DESCRIPTION OF THE DRAWINGS

Reference will now be made to the accompanying drawings, which are not necessarily drawn to scale, and wherein:

FIG. 7 depicts an illustrative embodiment of a look-up table utilized by the communication device of FIG. 1 for controlling tunable reactive networks of FIGS. 1-6;

DETAILED DESCRIPTION

Figure 1:
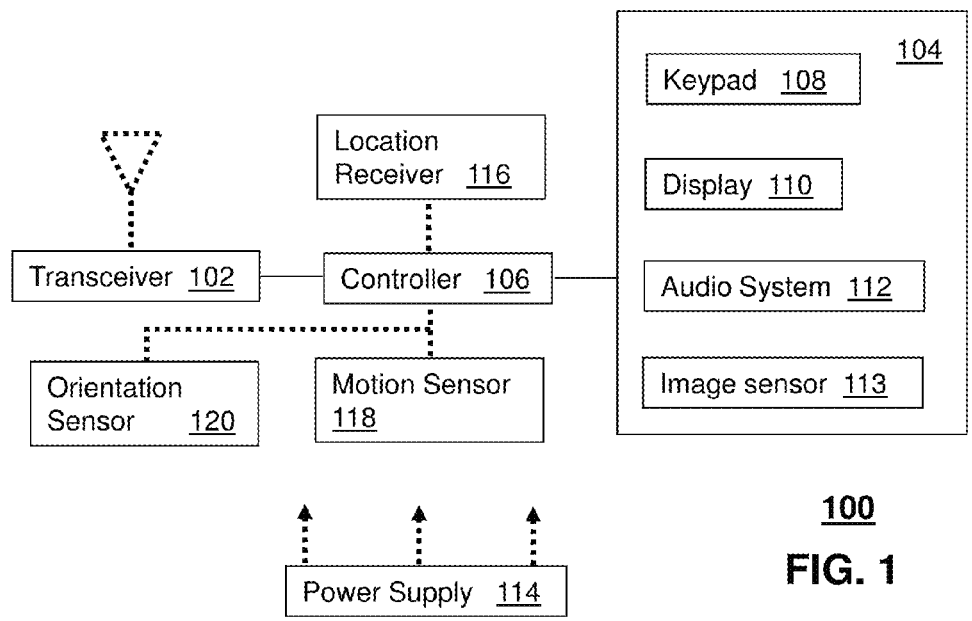
FIG. 1 depicts an illustrative embodiment of a communication device.

The subject disclosure describes, among other things, illustrative embodiments tuning multiple circuit components of a communication circuit. Other embodiments are contemplated by the subject disclosure.

One embodiment of the subject disclosure includes a computer-readable storage medium including computer instructions which, responsive to being executed by at least one processor, cause the at least one processor to perform operations including identifying an order of execution of a plurality of tuning algorithms, where each of the plurality of tuning algorithms controls one of a tunable reactive element, a control interface, or both of one of a plurality of circuit components of a radio frequency circuit of a communication device. Responsive to executing the computer instructions the at least one processor can further perform operations including executing a first tuning algorithm of the plurality of tuning algorithms according to the order of execution, detecting a stability condition of the first tuning algorithm, and executing a second tuning algorithm of the plurality of tuning algorithms responsive to the detected stability condition of the first tuning algorithm One embodiment of the subject disclosure includes a portable communication device including a plurality of circuit components of a radio frequency circuit, where each of circuit component of the plurality of circuit components comprises one of a tunable reactive element, a control interface, or both for enabling at least one of a plurality of tuning algorithms to control an operation of the circuit component. The portable communication device can further include a memory storing computer instructions, and a controller coupled to the memory and the tunable reactive element of each of the plurality of circuit components. Responsive to executing the computer instructions the controller can perform operations including executing a first tuning algorithm of the plurality of tuning algorithms according to an order of execution of a plurality of tuning algorithms, detecting a stability condition of the first tuning algorithm, and executing a second tuning algorithm of the plurality of tuning algorithms responsive to the detected stability condition of the first tuning algorithm.

One embodiment of the subject disclosure includes a method for detecting, by a processor, a plurality of use cases of a communication device, and determining, by the processor, an initial tuning state for each of a plurality of tuning algorithms according to the plurality of use cases, where each of the plurality of tuning algorithms controls one of a tunable reactive element, a control interface, or both of one of a plurality of circuit components of a radio frequency circuit. The method can further include configuring, by the processor, each of the plurality of tuning algorithms according to their respective initial tuning state, executing, by the processor, a first tuning algorithm of the plurality of tuning algorithms according to an order of execution of the plurality of tuning algorithms, detecting, by the processor, a stability condition of the first tuning algorithm, and executing, by the processor, a second tuning algorithm of the plurality of tuning algorithms responsive to the detected stability condition of the first tuning algorithm.

FIG. 1 depicts an illustrative embodiment of a communication device 100. The communication device 100 can comprise a wireline and/or wireless transceiver 102 having transmitter and receiver sections (herein transceiver 102), a user interface (UI) 104, a power supply 114, a location receiver 116, a motion sensor 118, an orientation sensor 120, and a controller 106 for managing operations thereof. The transceiver 102 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 102 can also be adapted to support circuit-switched wireline access technologies (such as PSTN), packet-switched wireline access technologies (such as TCP/IP, VoIP, etc.), and combinations thereof.

The UI 104 can include a depressible or touch-sensitive keypad 108 with a navigation mechanism such as a roller ball, a joystick, a mouse, or a navigation disk for manipulating operations of the communication device 100. The keypad 108 can be an integral part of a housing assembly of the communication device 100 or an independent device operably coupled thereto by a tethered wireline interface (such as a USB cable) or a wireless interface supporting, for example, Bluetooth. The keypad 108 can represent a numeric keypad commonly used by phones, and/or a QWERTY keypad with alphanumeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is touch-sensitive, a portion or all of the keypad 108 can be presented by way of the display 110 with navigation features.

The display 110 can use touch screen technology to also serve as a user interface for detecting user input. As a touch screen display, the communication device 100 can be adapted to present a user interface with graphical user interface (GUI) elements that can be selected by a user with a touch of a finger. The touch screen display 110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 110 can be an integral part of the housing assembly of the communication device 100 or an independent device communicatively coupled thereto by a tethered wireline interface (such as a cable) or a wireless interface.

The UI 104 can also include an audio system 112 that utilizes audio technology for conveying low volume audio (such as audio heard in proximity of a human ear) and high volume audio (such as speakerphone for hands free operation). The audio system 112 can further include a microphone for receiving audible signals of an end user. The audio system 112 can also be used for voice recognition applications. The UI 104 can further include an image sensor 113 such as a charged coupled device (CCD) camera for capturing still or moving images.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, or in combination, the charging system can utilize external power sources such as DC power supplied over a physical interface such as a USB port or other suitable tethering technologies.

The location receiver 116 can utilize location technology such as a global positioning system (GPS) receiver capable of assisted GPS for identifying a location of the communication device 100 based on signals generated by a constellation of GPS satellites, which can be used for facilitating location services such as navigation. The motion sensor 118 can utilize motion sensing technology such as an accelerometer, a gyroscope, or other suitable motion sensing technology to detect motion of the communication device 100 in three-dimensional space. The orientation sensor 120 can utilize orientation sensing technology such as a magnetometer to detect the orientation of the communication device 100 (north, south, west, and east, as well as combined orientations in degrees, minutes, or other suitable orientation metrics).

The communication device 100 can use the transceiver 102 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 106 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 100.

Other components not shown in FIG. 1 are contemplated by the subject disclosure. The communication device 100 can include a slot for inserting or removing an identity module such as a Subscriber Identity Module (SIM) card. SIM cards can be used for identifying and registering for subscriber services, executing computer programs, storing subscriber data, and so forth.

The communication device 100 as described herein can operate with more or less of the circuit components shown in FIG. 1.

Figure 2:
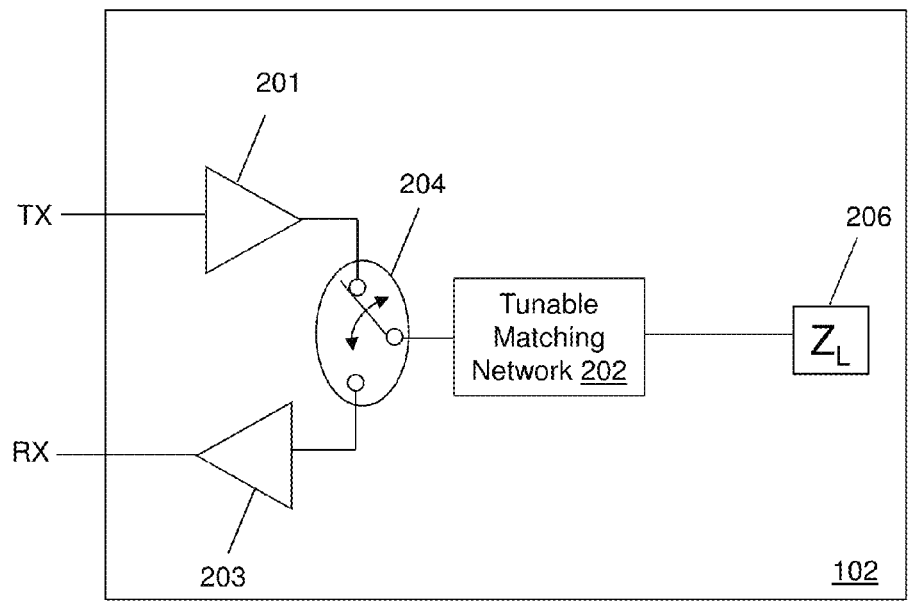
FIG. 2 depicts an illustrative embodiment of a portion of a transceiver of the communication device of FIG. 1.

FIG. 2 depicts an illustrative embodiment of a portion of the wireless transceiver 102 of the communication device 100 of FIG. 1. In GSM applications, the transmit and receive portions of the transceiver 102 can include amplifiers 201, 203 coupled to a tunable matching network 202 that is in turn coupled to an impedance load 206. The impedance load 206 in the present illustration can be an antenna as shown in FIG. 1 (herein antenna 206). A transmit signal in the form of a radio frequency (RF) signal (TX) can be directed to the amplifier 201 which amplifies the signal and directs the amplified signal to the antenna 206 by way of the tunable matching network 202 when switch 204 is enabled for a transmission session. The receive portion of the transceiver 102 can utilize a pre-amplifier 203 which amplifies signals received from the antenna 206 by way of the tunable matching network 202 when switch 204 is enabled for a receive session. Other configurations of FIG. 2 are possible for other types of cellular access technologies such as CDMA. These undisclosed configurations are contemplated by the subject disclosure.

Figure 3:
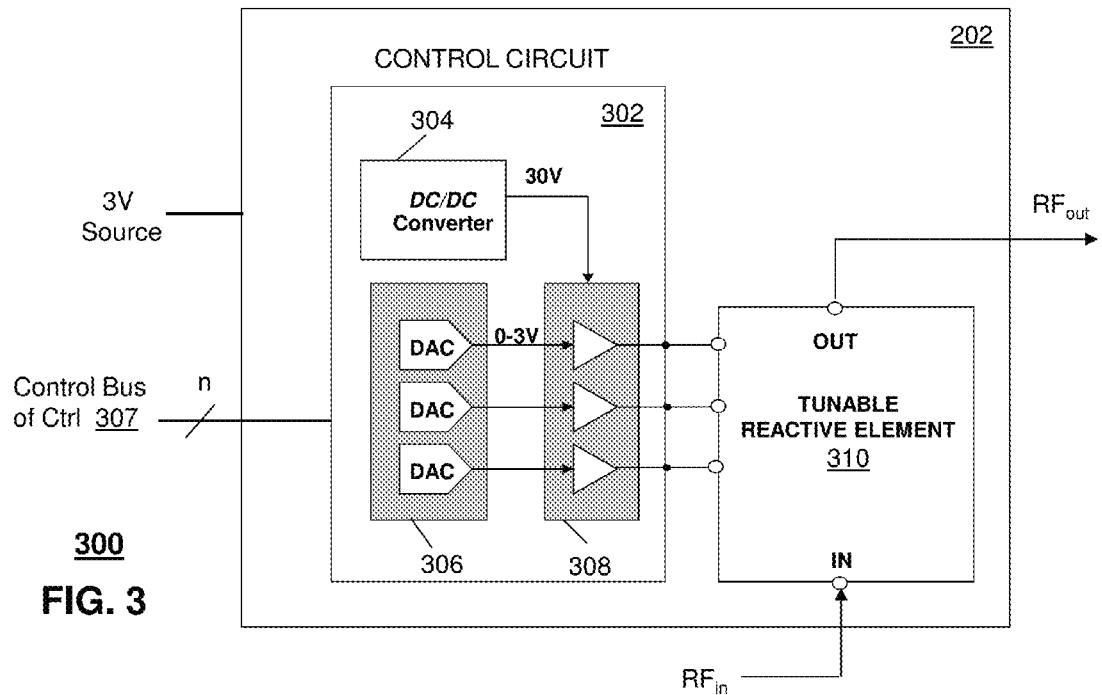
FIGS. 3-6 depict illustrative embodiments of a tunable matching network of the transceiver of FIG. 2.
Figure 4:
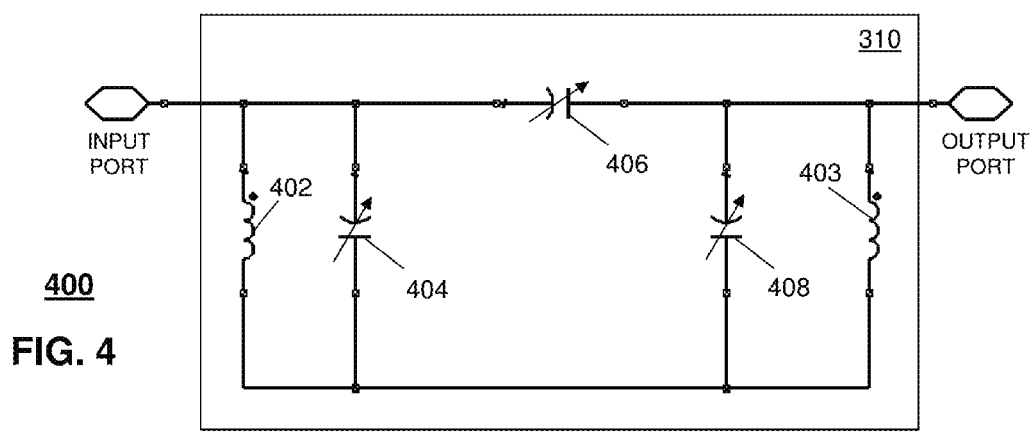

FIGS. 3-4 depict illustrative embodiments of the tunable matching network 202 of the transceiver 102 of FIG. 2. In one embodiment, the tunable matching network 202 can comprise a control circuit 302 and a tunable reactive element 310. The control circuit 302 can comprise a DC-to-DC converter 304, one or more digital to analog converters (DACs) 306 and one or more corresponding buffers 308 to amplify the voltage generated by each DAC. The amplified signal can be fed to one or more tunable reactive components 404, 406 and 408 such as shown in FIG. 4, which depicts a possible circuit configuration for the tunable reactive element 310. In this illustration, the tunable reactive element 310 includes three tunable capacitors 404-408 and two inductors 402-403 with a fixed inductance. Circuit configurations such as "Tee", "Pi", and "L" configurations for a matching circuit are also suitable configurations that can be used in the subject disclosure.

The tunable capacitors 404-408 can each utilize technology that enables tunability of the reactance of the component. One embodiment of the tunable capacitors 404-408 can utilize voltage or current tunable dielectric materials. The tunable dielectric materials can utilize, among other things, a composition of barium strontium titanate (BST). In another embodiment, the tunable reactive element 310 can utilize semiconductor varactors. Other present or next generation methods or material compositions that result in a voltage or current tunable reactive element are contemplated by the subject disclosure for use by the tunable reactive element 310 of FIG. 3.

The DC-to-DC converter 304 can receive a DC signal such as 3 volts from the power supply 114 of the communication device 100 in FIG. 1. The DC-to-DC converter 304 can use technology to amplify a DC signal to a higher range (e.g., 30 volts) such as shown. The controller 106 can supply digital signals to each of the DACs 306 by way of a control bus 307 of "n" or more wires to individually control the capacitance of tunable capacitors 404-408, thereby varying the collective reactive impedance of the tunable matching network 202. The control bus 307 can be implemented with a two-wire serial bus technology such as a Serial Peripheral Interface (SPI) bus (referred to herein as SPI bus 307). With an SPI bus 307, the controller 106 can transmit serialized digital signals to configure each DAC in FIG. 3. The control circuit 302 of FIG. 3 can utilize digital state machine logic to implement the SPI bus 307, which can direct digital signals supplied by the controller 106 to the DACs to control the analog output of each DAC, which is then amplified by buffers 308. In one embodiment, the control circuit 302 can be a stand-alone component coupled to the tunable reactive element 310. In another embodiment, the control circuit 302 can be integrated in whole or in part with another device such as the controller 106.

Although the tunable reactive element 310 is shown in a unidirectional fashion with an RF input and RF output, the RF signal direction is illustrative and can be interchanged. Additionally, either port of the tunable reactive element 310 can be connected to a feed point of the antenna 206, a radiating element of the antenna 206 in an on-antenna configuration, or between antennas for compensating cross-coupling when diversity antennas are used. The tunable reactive element 310 can also be connected to other circuit components of a transmitter or a receiver section such as filters, power amplifiers, and so on.

Figure 6:
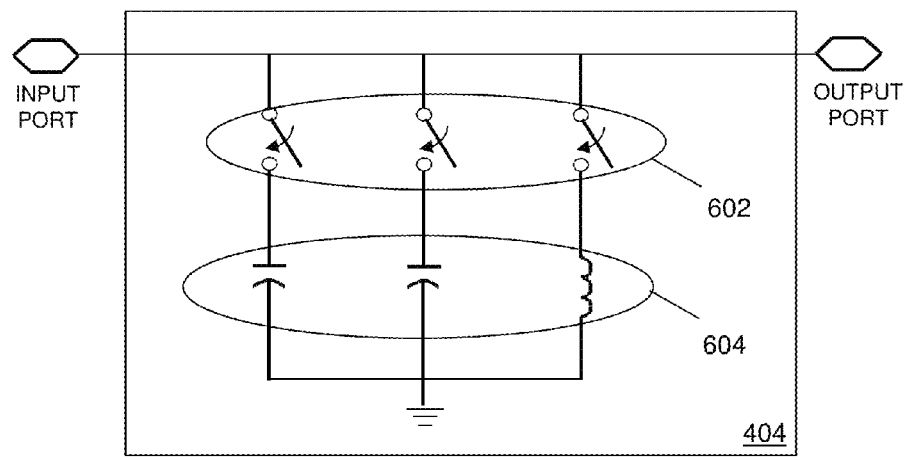

In another embodiment, the tunable matching network 202 of FIG. 2 can comprise a control circuit 502 in the form of a decoder and a tunable reactive element 504 comprising switchable reactive elements such as shown in FIG. 6. In this embodiment, the controller 106 can supply the control circuit 402 signals via the SPI bus 307, which can be decoded with Boolean or state machine logic to individually enable or disable the switching elements 602. The switching elements 602 can be implemented with semiconductor switches, micro-machined switches such as utilized in micro-electromechanical systems (MEMS), or other suitable switching technology. By independently enabling and disabling the reactive elements 607 (capacitor or inductor) of FIG. 6 with the switching elements 602, the collective reactive impedance of the tunable reactive element 504 can be varied by the controller 106.

Figure 5:
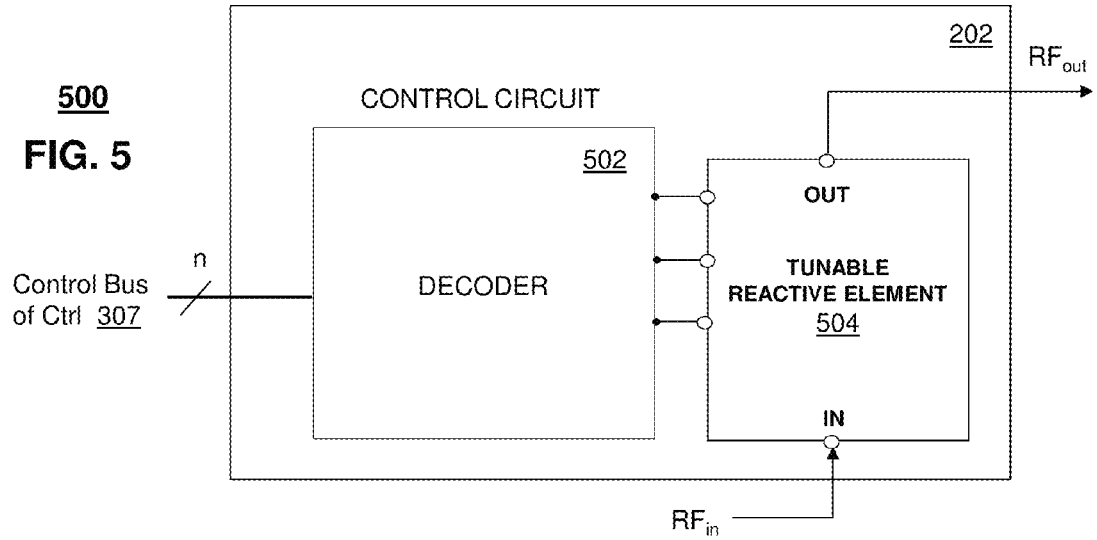

The tunable reactive elements 310 and 504 of FIGS. 3 and 5, respectively, can be used with various circuit components of the transceiver 102 to enable the controller 106 to manage performance factors such as, for example, but not limited to, transmit power, transmitter efficiency, receiver sensitivity, power consumption of the communication device 100, frequency band selectivity by adjusting filter passbands, linearity and efficiency of power amplifiers, specific absorption rate (SAR) requirements, and so on.

Figure 8:
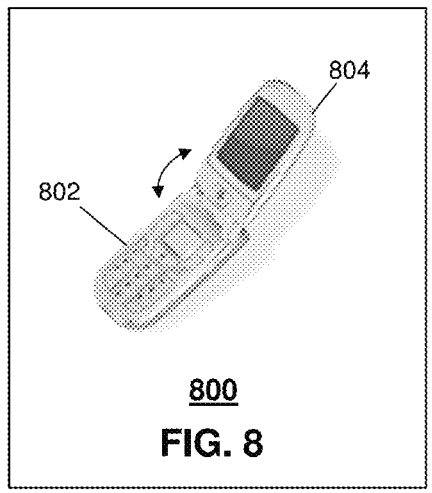
FIGS. 8-11 depict illustrative physical and operational use cases of a communication device.

FIG. 7 depicts an illustration of a look-up table stored in memory, which can be indexed by the controller 106 of the communication device 100 of FIG. 1 according to physical and/or functional use cases of the communication device 100. A physical use case can represent a physical state of the communication device 100, while a functional use case can represent an operational state of the communication device 100. For example, for a flip phone 800 of FIG. 8, an open flip can represent one physical use case, while a closed flip can represent another physical use case. In a closed flip state (i.e., bottom and top flips 802-804 are aligned), a user is likely to have his/her hands surrounding the top flip 802 and the bottom flip 804 while holding the phone 800, which can result in one range of load impedances experienced by an internal or retrievable antenna (not shown) of the phone 800. The range of load impedances of the internal or retrievable antenna can be determined by empirical analysis.

With the flip open a user is likely to hold the bottom flip 802 with one hand while positioning the top flip 804 near the user's ear when an audio system of the phone 800, such audio system 112 of FIG. 1, is set to low volume. If, on the other hand, the audio system 112 is in speakerphone mode, it is likely that the user is positioning the top flip 804 away from the user's ear. In these arrangements, different ranges of load impedances can be experienced by the internal or retrievable antenna, which can be analyzed empirically. The low and high volume states of the audio system 112 illustrate varying functional use cases.

Figure 9:
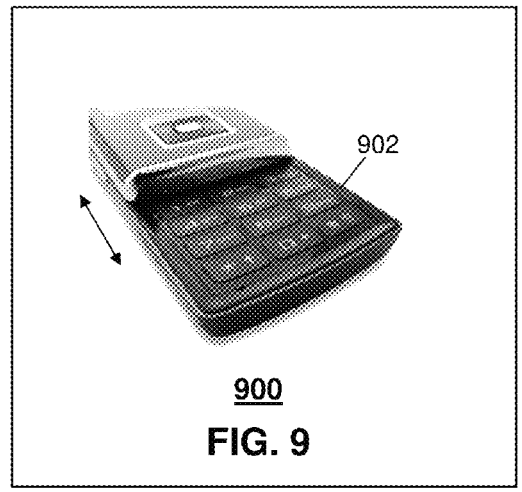
Figure 10:
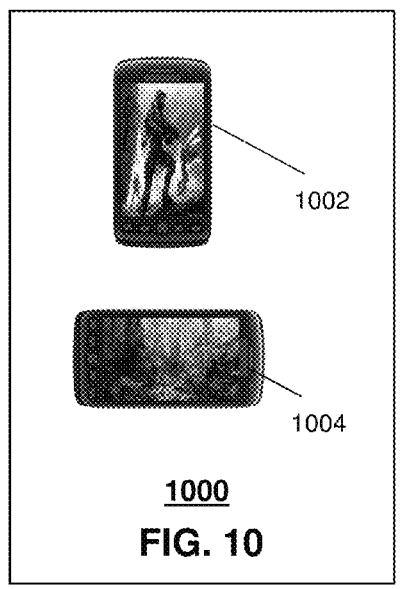
Figure 11:
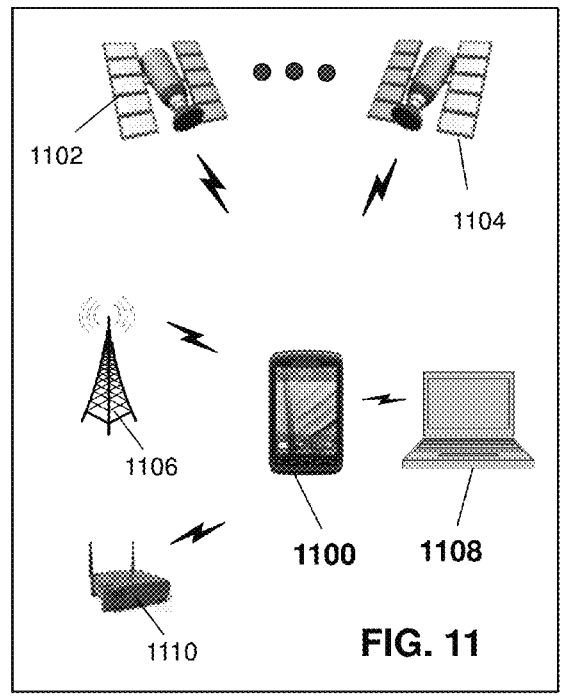

For a phone 900 with a slideable keypad 904 (illustrated in FIG. 9), the keypad in an outward position can present one range of load impedances of an internal antenna, while the keypad in a hidden position can present another range of load impedances, each of which can be analyzed empirically. For a smartphone 1000 (illustrated in FIG. 10) presenting a video game, an assumption can be made that the user is likely to hold the phone away from the user's ear in order to view the game. Placing the smartphone 1000 in a portrait position 1002 can represent one physical and operational use case, while utilizing the smartphone 1000 in a landscape position 1004 presents another physical and operational use case.

The number of hands and fingers used in the portrait mode may be determined by the particular type of game being played by the user. For example, a particular video game may require a user interface where a single finger in portrait mode is sufficient for controlling the game. In this scenario, it may be assumed that the user is holding the smartphone 1000 in one hand in portrait mode and using a finger with the other. By empirical analysis, a possible range of impedances of the internal antenna can be determined when using this video game in portrait mode. Similarly, if the video game selected has a user interface that is known to require two hands in landscape mode, another estimated range of impedances of the internal antenna can be determined empirically.

A multimode phone 1100 capable of facilitating multiple access technologies such as GSM, CDMA, LTE, WiFi, GPS, and/or Bluetooth in two or more combinations can provide additional insight into possible ranges of impedances experienced by two or more internal antennas of the multimode phone 1100. For example, a multimode phone 1100 that provides GPS services by processing signals received from a constellation of satellites 1102, 1104 can be empirically analyzed when other access technologies are also in use. Suppose, for instance, that while navigation services are enabled, the multimode phone 1100 is facilitating voice communications by exchanging wireless messages with a cellular base station 1106. In this state, an internal antenna of the GPS receiver may be affected by a use case of a user holding the multimode phone 1100 (e.g., near the user's ear or away from the user's ear). The affect on the GPS receiver antenna and the GSM antenna by the user's hand position can be empirically analyzed.

Suppose in another scenario that the antenna of a GSM transceiver is in close proximity to the antenna of a WiFi transceiver. Further assume that the GSM frequency band used to facilitate voice communications is near the operational frequency of the WiFi transceiver. Also assume that a use case for voice communications may result in certain physical states of the multimode phone 1100 (e.g., slider out), which can result in a probable hand position of the user of the multimode phone 1100. Such a physical and functional use case can affect the impedance range of the antenna of the WiFi transceiver as well as the antenna of the GSM transceiver.

A close proximity between the WiFi and GSM antennas and the near operational frequency of the antennas may also result in cross-coupling between the antennas, thereby changing the load impedance of each of the antennas. Cross-coupling under these circumstances can be measured empirically. Similarly, empirical measurements of the impedances of other internal antennas can be measured for particular physical and functional use configurations when utilizing Bluetooth, WiFi, Zigbee, or other access technologies in peer-to-peer communications with another communication device 1108 or with a wireless access point 1110.

The number of physical and functional use cases of a communication device 100 can be substantial when accounting for combinations of access technologies, frequency bands, antennas of multiple access technologies, antennas configured for diversity designs such as multiple-input and multiple output (MIMO) antennas, and so on. These combinations, however, can be empirically analyzed to load impedances and affects on other tunable circuits. The empirical data collected can be recorded in the look-up table of FIG. 7 and indexed according to corresponding combinations of physical and functional use cases. The information stored in the look-up table can be used in open-loop RF tuning applications to initialize tunable circuit components of a transceiver, as well as, tuning algorithms that control operational aspects of the tunable circuit components.

Figure 12:
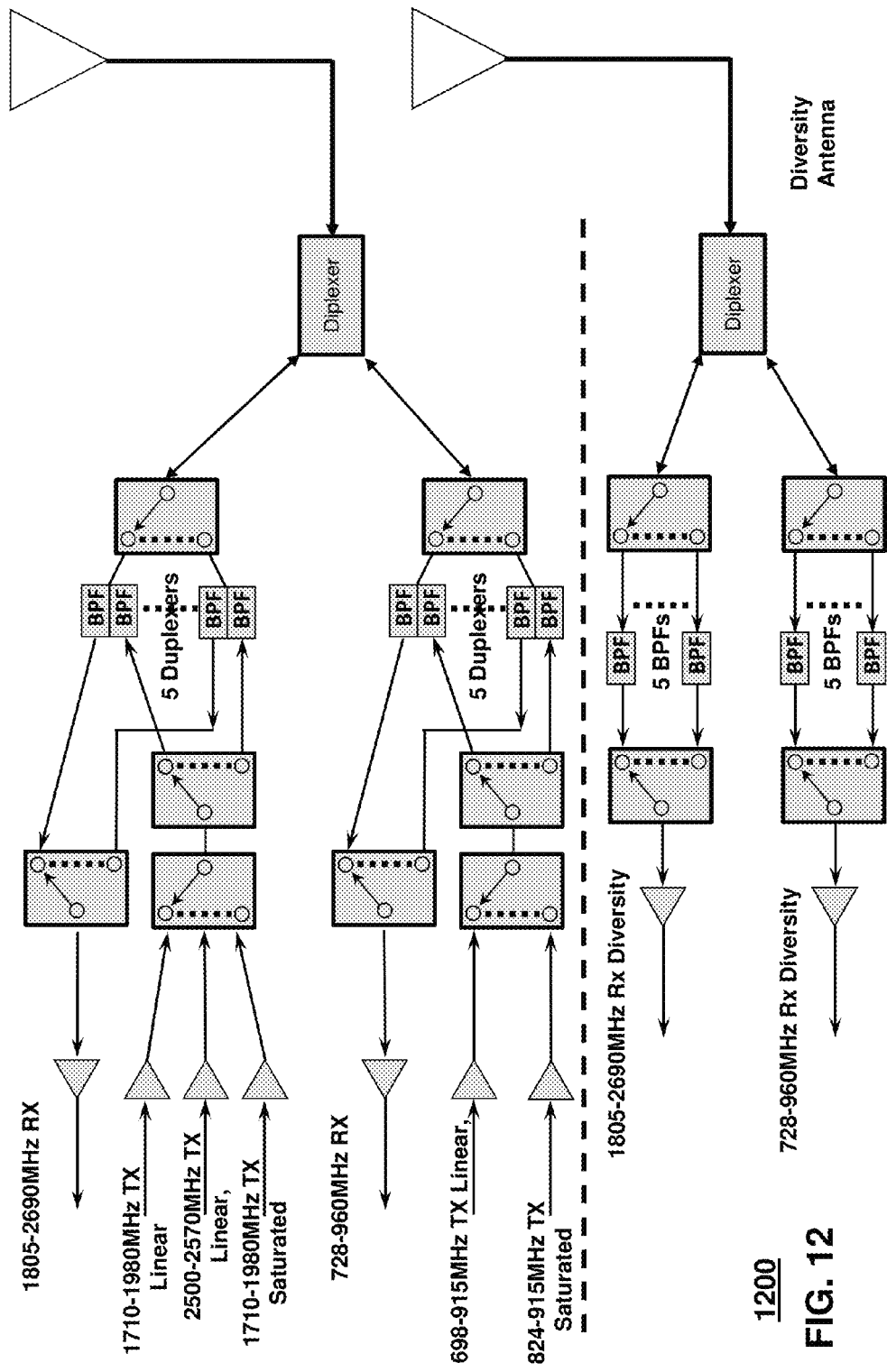
FIG. 12 depicts an illustrative embodiment of a multi-mode transceiver.

FIG. 12 depicts an illustrative embodiment of a multimode transceiver 1200. In this illustration, the multimode transceiver 1200 can include receiver and transmitter portions, which can be configured by way of switches that interconnect amplifiers and bandpass filters for operation at different frequency bands. In addition, FIG. 12 illustrates an embodiment where a diversity receiver can be used to improve system performance of the multimode transceiver 1200.

Figure 13:
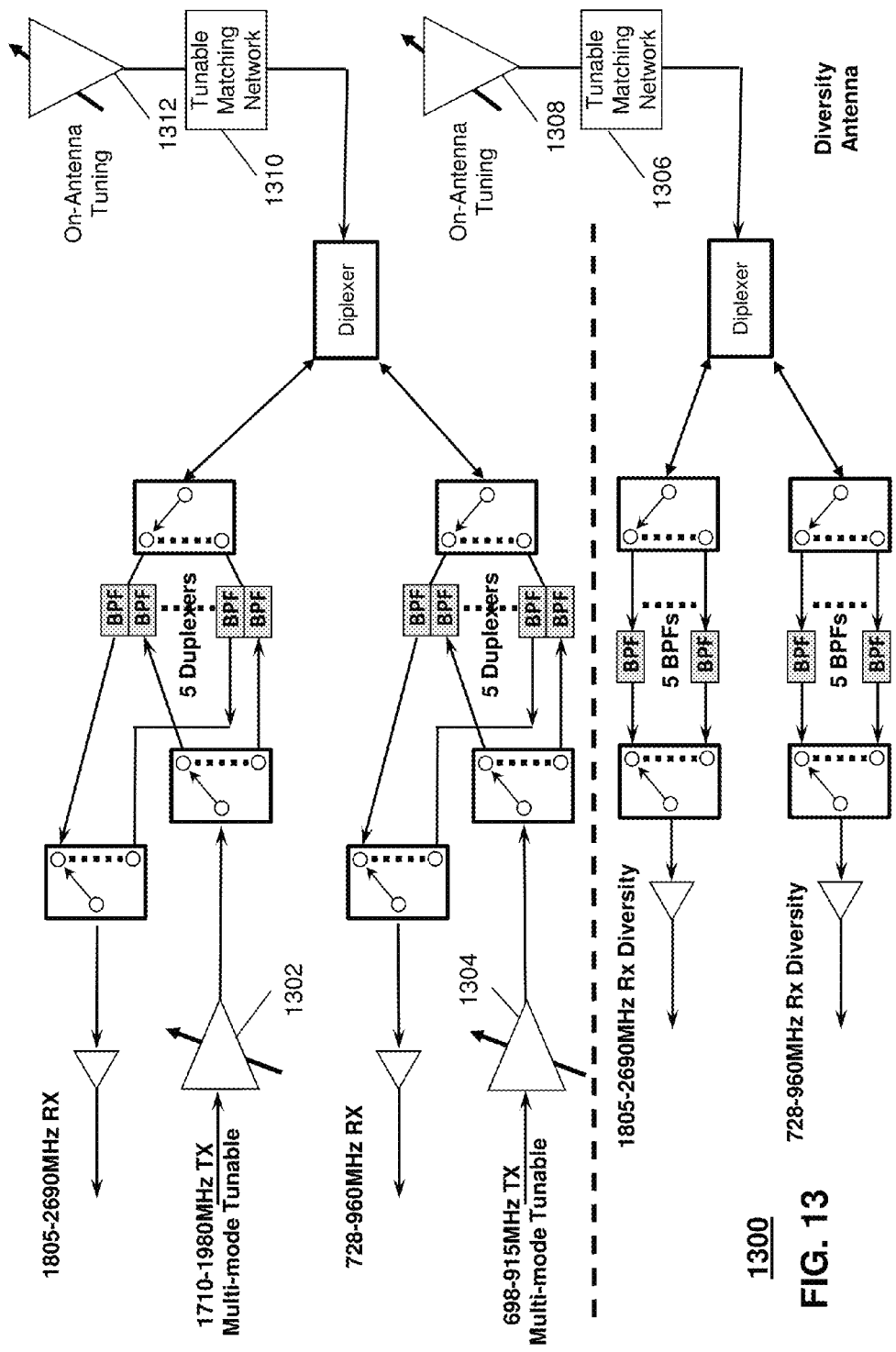
FIGS. 13-14 depict illustrative embodiments of a multi-mode transceiver with tunable circuit components.

FIG. 13 depicts an illustrative embodiment of a multimode transceiver 1300, which can be a representative embodiment of the transceiver 102 of FIG. 1. In this illustration, multimode amplifiers 1302, 1304 can be tuned with tunable reactive elements such as the variable reactive elements shown in FIGS. 4 and 6 in similar or different circuit configurations. A first of the multimode amplifiers 1302 can be configured to operate in a range of high band signals, while a second of the multimode amplifiers 1304 can be configured to operate in a range of low band signals. The multimode amplifiers 1302, 1304 can also be tuned according to bias and power signals controlled by a processor such as controller 106 of FIG. 1. By configuring the multimode amplifiers 1302, 1304 as tunable, the number of transmitter amplifiers previously shown in FIG. 12 can be reduced, which can improve circuit board layout complexity, and potentially lower cost.

Tunable matching networks 1306 and 1310 (such as those shown in FIGS. 3 and 5) can be used at or near the feed point of antennas 1308 and 1312 to compensate for impedance changes of the antennas. Similarly tunable reactive elements can be applied to radiating elements of antennas 1308 and 1312 for on-antenna tuning. To simplify the transceiver architecture of FIG. 13, tunable reactive elements can also be applied to the bandpass filters to vary the passband of these filters and thereby enable the filters to operate as multimode filters shown in FIG. 14.

Figure 14:
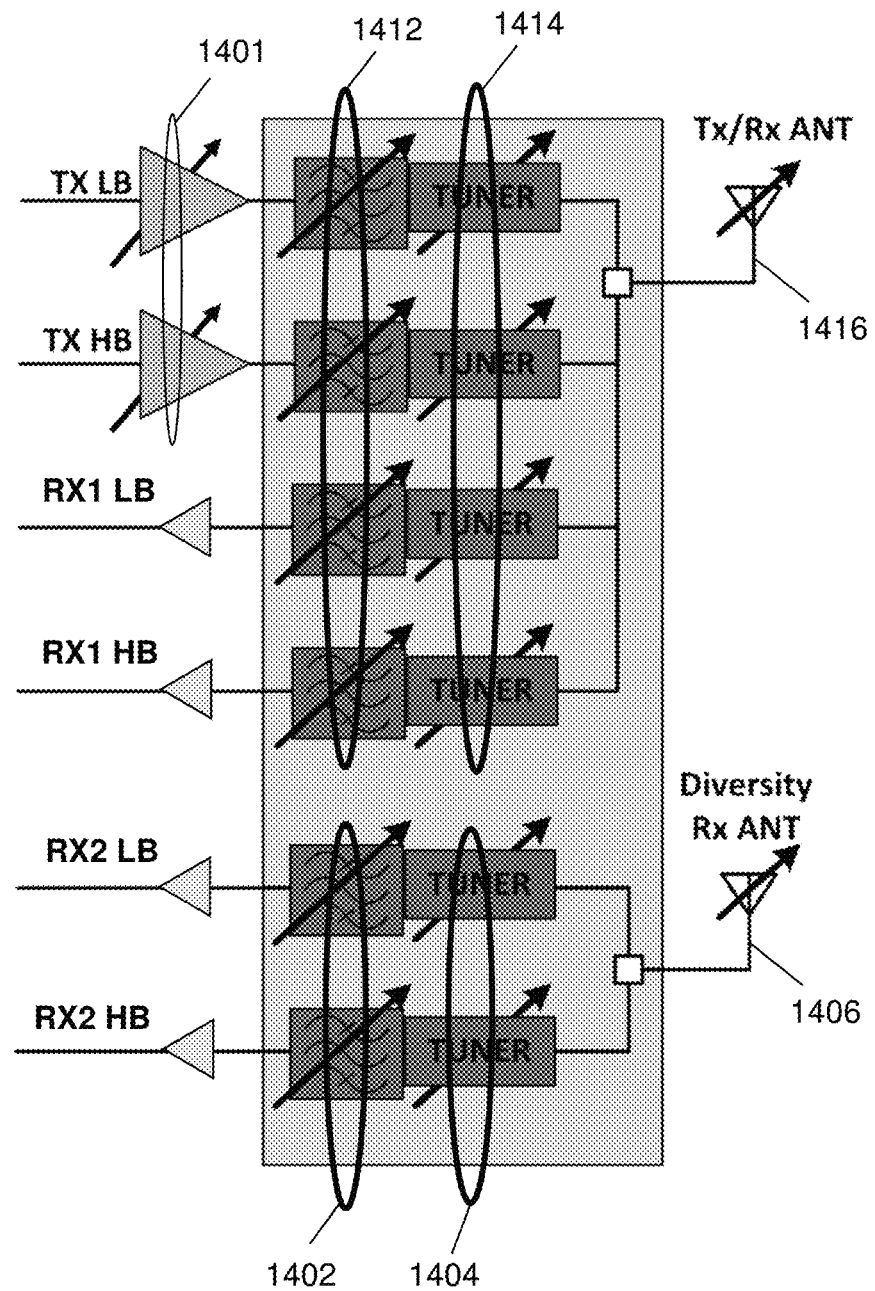
Figure 15:
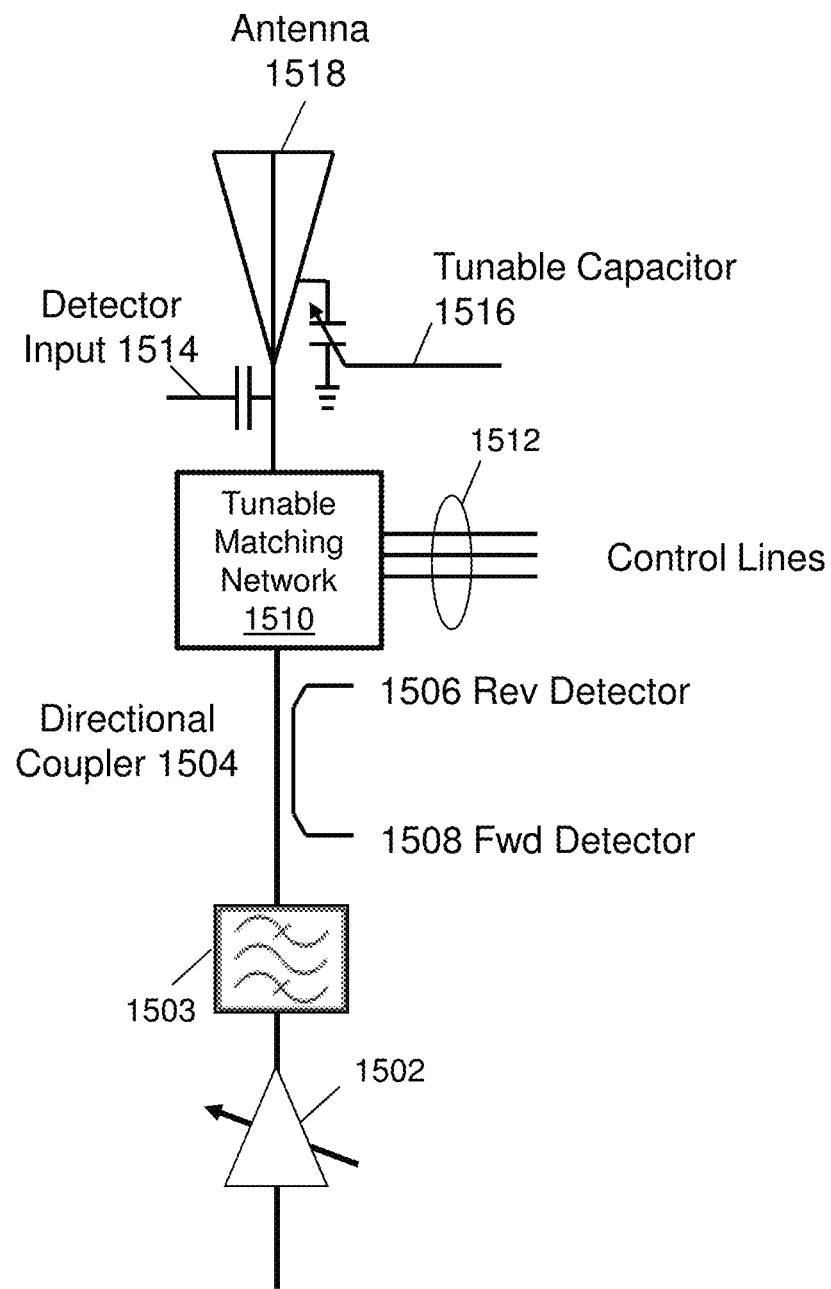
FIG. 15 depicts an illustrative embodiment of a transmitter section with tunable circuit components.

FIG. 14 illustrates a transceiver architecture with multimode amplifiers 1401, multimode filters 1402, 1412, multimode matching networks 1404, 1414, and tunable diversity antennas 1406, 1416. In this configuration, the switches shown in FIG. 12 may be eliminated in whole or in part, thereby reducing complexity yet further. FIG. 15 illustrates a transmission path of FIG. 14 depicting a tunable amplifier 1502, directional coupler 1504 (with forward and reverse detectors 1506, 1508), tunable matching network 1510 with control lines 1512, and a reactive tuning element 1516 coupled to the antenna 1518 for on-antenna tuning and a corresponding detector 1514.

It should be noted that the illustrations of FIGS. 13-15 may be modified to utilize more or less circuit components to achieve a desirable design objective. In another embodiment, FIGS. 13-14 can be simplified by removing the diversity receiver section in situations where cost and circuit board real estate is limited, or when additional receiver performance is not necessary.

Figure 16:
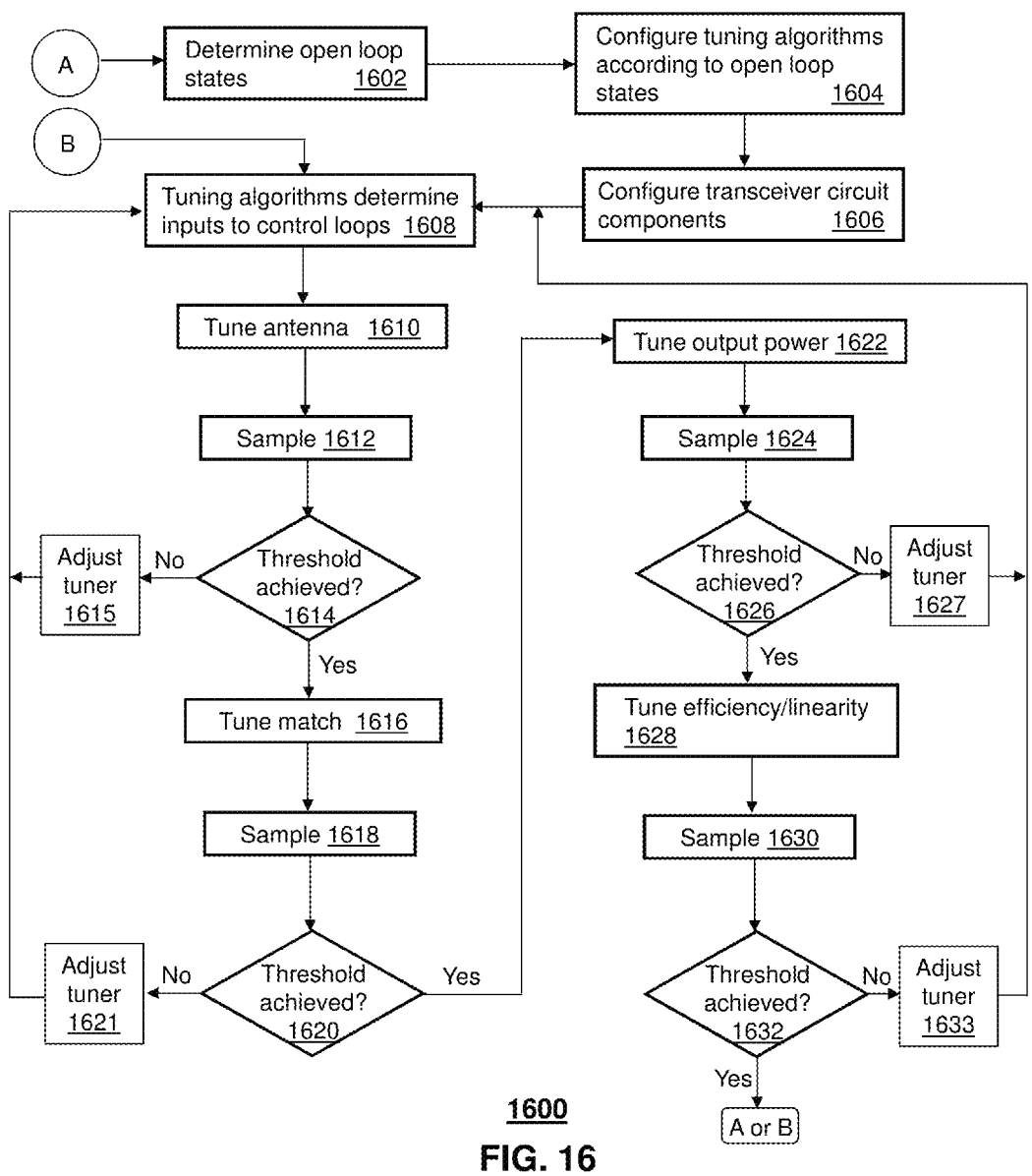
FIG. 16 depicts an illustrative embodiment of a method that can be used to tune the tunable components of FIGS. 13-15.

FIG. 16 depicts an illustrative method 1600 for managing tuning algorithms that control one or more of the tunable circuit components shown in FIGS. 13-15. For illustration purposes, the communication device 100 of FIG. 1 will be referred to in the discussions that follow for method 1600.

Method 1600 can be implemented by computer instructions executable by the controller 106 of communication device 100, and/or by hardware such as state machine logic that implements in whole or in part the flow diagram of method 1600. Method 1600 can begin with step 1602 in which the controller 106 determines from physical and functional use cases of the communication device 100 a number of open loop states.

The physical use case can be determine from electromechanical sensors, proximity sensors, or other sensing technology to determine a physical state of the communication device 100 (e.g., flip open, slider out, antenna retrieved, etc.). The functional use cases can be determined from flags, registers, or other indicators used by the controller 106 to track the operational state of the communication device 100 (e.g., frequency band, access technology(ies) in use, software applications in use and their corresponding user interface profiles, etc.). Based on the physical and functional use cases, the controller 106 can determine from a look-up table stored in memory (such as illustrated in FIG. 7) the open loop states of the communication device 100.

At step 1604, the controller 106 can configure tuning algorithms according to the open loop states. The tuning algorithms can include without limitation, a tuning algorithm for on-antenna tuning, a tuning algorithm for the matching network, a tuning algorithm for the multimode filters, a tuning algorithm for controlling output power of a power amplifier of a transmitter section, a tuning algorithm for controlling linearity and efficiency of the power amplifier, and so forth. The open loop states can indicate an initial tuning state for configuring a tunable reactive element or network used by the tunable circuit components shown in FIGS. 13-15. At step 1606, the open loop states can also define a configuration of switches shown in FIG. 13 (when multimode filters are not used) as well as bias and supply voltage settings for the transmitter and/or receiver amplifiers.

At step 1608, the tunable algorithms can determine inputs to the control loops of each algorithm. The inputs can be determined from the sensing circuits used by each tuner. For example, referring to FIG. 15, the detector 1514 can measure an RF voltage level which the tuning algorithm can analyze to determine the effectiveness of tuning the antenna 1518 according to the tuning state applied by the on-antenna tuner 1516 established according to the initial open loop settings used at steps 1604, 1606. Similarly, the reverse and forward detectors 1506, 1508 can provide forward and reverse RF voltages which can be used by the tuning algorithm to determine the effectiveness of tuning for a match to the antenna 1518 based on the initial tuning state established by the open loop settings applied to the matching network 1510. Sensors can be used to sense the output power of the power amplifier 1502 which a tuning algorithm can use to compare to a power step applied to the amplifier based on the initial bias and supply voltages used to configure the power amplifier 1502 according to the open loop settings used at step 1606. Additionally, sensors can be used by a tuning algorithm to determine output power and current drain to assess the efficiency of the power amplifier 1502 after it has been configured with open loop settings. The same or additional sensors can be used by a tuning algorithm to measure peak power and average power to determine the effective linearity of the power amplifier 1502 after it has been configured with open loop settings.

Once these determinations have been made, the controller 106 can enable execution of the tuning algorithms. In one embodiment, the tuning algorithms can be invoked according to an order of execution, which may be predefined by assigning priority levels to the algorithms. To distinguish between priority levels, each tuning algorithm can be given a numerical weight. The numerical weight can be fixed, or variable depending on, for example, an aggregate performance of the tuning algorithms. In one embodiment, the on-antenna tuner can be given the highest priority and is thereby executed first at step 1610. After measuring the state of the antenna 1518 at step 1612, the on-antenna tuner can determine at step 1614 whether a desired performance threshold (e.g., a desired impedance of the antenna 1518) has been achieved. If it has not, then the tuning algorithm can proceed to step 1615 and adjust the tunable reactive element 1516. A condition of stability can be attained by the on-antenna tuning algorithm by achieving the desired threshold at step 1614 for tuning the antenna 1518.

Since the change in impedance of the tunable reactive element 1516 can affect other tunable circuit components, the control loop repeats at step 1608 where all tuning algorithms are given an opportunity to measure the state of their corresponding tunable circuit component. To avoid contention between algorithms, and excessive execution time by any particular algorithm, the controller 106 can utilize semaphore flags and set timers when executing tuning algorithms. In a multitasking arrangement, semaphore flags can enable the tuning algorithms to detect which tuning algorithm(s) is/are active, and thereby avoid overlaps between tuning algorithms which can cause undesirable and perhaps unstable conditions between algorithms. Timers can be used to balance computing resources supplied to the tuning algorithms, control the effective tuning rate of the algorithms, and avoid any one algorithm burdening or slowing the tuning rate of another algorithm.

In addition to semaphores and timers, the tuning algorithms can be configured to limit the rate or speed of tuning used by the algorithm. The tuning algorithms can also be configured to limit a magnitude of each tuning step applied to a corresponding circuit component, limit a number of tuning steps applied to the corresponding circuit component, limit tuning of the corresponding circuit component to a specific tuning range, or combinations thereof. Moreover, each of the tuning algorithms can be given an opportunity to request a cycle to tune outside of a given execution order. For instance, a tuning algorithm with a higher priority level can preempt a tuning algorithm of lower priority. When preemption occurs, the controller 106 can cause the lower priority tuning algorithm to cease operation until the requesting algorithm has achieved a desirable tuning threshold, at which time the controller 106 can re-enable to lower priority tuning algorithm.

A tuning algorithm may seek preemption as a result of executing step 1608. For instance, a tuning algorithm that made an adjustment may have negatively impacted another algorithm's prior tuning performance. The severity of the impact can be sufficient to invoke a preemption request by the algorithm. To prevent excessive preemption requests, each algorithm can be assigned a preemption threshold that defines an acceptable range of error inadvertently applied by tuning effects of other algorithms. The preemption threshold can provide hysteresis to dampen preemption requests and add further stability to the overall control loop.

In addition to semaphores, timers, and preemptive requests, the controller 106 can be configured to monitor the performance of the tuning algorithms collectively, and thereby determine an aggregate or accumulation error caused by the algorithms. The aggregate error can provide for a measure of a gap between a desirable system tuning threshold for the entire control loop and actual performance. The controller 106 can be adapted to change the priority levels of the tuning algorithms, and their respective execution order based on this aggregate measure. Furthermore, the controller 106 can also analyze a measure of error experienced by each algorithm and adjust priority levels to assist one or more algorithms that are struggling to achieve their respective thresholds. Tuning thresholds of each tuning algorithm can also be modified by the controller 106 based on the aggregate error and/or individual measures of error if the controller 106 determines that the overall tuning performance of the control loop has not reached a desirable system threshold. For example, the tuning thresholds can be modified by raising or lowering the respective thresholds of the tuning algorithms to achieve the desirable system threshold.

In yet another embodiment, the controller 106 can be configured to execute a "parent" tuning algorithm that oversees the performance of the tuning algorithms collectively. In one embodiment, individual tuning algorithms can assert a "fault flag" which they can set when the algorithm detects a fault condition within itself. The fault condition can indicate an inability by the tuning algorithm to converge on a desired threshold within a predetermined period. A fault condition can also indicate that the tuning algorithm has converged to a state of operation that is undesirable. The "parent" tuning algorithm can act on this differently than preemption requests as described above. For example, if a particular tuning algorithm maintains the fault flag for more than one iteration, the parent tuning algorithm may restart all of the tuning algorithms to allow them to determine a new set of stable conditions.

Referring back to FIG. 16, once the on-antenna tuning algorithm has achieved a desirable tuning threshold at step 1614, the controller 106 can invoke at step 1616 execution of another tuning algorithm that controls the variable impedance of the matching network 1510. The tuning algorithm can sample at step 1618 signals from the forward and reverse detectors 1506, 1508 to determine a current figure of merit and compare it to a desirable tuning threshold in the form of a desirable figure of merit threshold. The figure of merit can include amplitude and phase of the forward and reverse detectors 1506, 1508, the output voltage from detector 1514, and knowledge of the current tuning state of the matching network 1510 at step 1620. If the current figure of merit does not satisfy or exceed the desirable figure of merit threshold, the tuning algorithm can proceed to step 1621 where it adjusts the impedance of the matching network 1510, and repeats the control loop at step 1608. The iterations continue until such time as the tuning algorithm achieves the desirable figure of merit threshold, the timer expires, or the tuning algorithm is preempted.

Once the desirable figure of merit threshold has been achieved, the controller 106 can invoke the tuning algorithm for the power amplifier at step 1622. It should be noted that the desirable tuning thresholds of each tuning algorithm can be hierarchical. Thus, a first desirable threshold may serve as a coarse tuning threshold, while subsequent thresholds can be more aggressive towards achieving a tuning target. Additionally, it should be noted that thresholds may not in all instances require optimal performance of a particular tuning stage. For instance, to avoid a SAR requirement, one or more of the tuning algorithms may be configured to operate below their optimal range. In addition, tuning thresholds may differ between operational states of the communication device 100 (e.g., frequency band selected, whether tuning is taking place between transmit bursts, or during a transmit burst, and so on). Further, as noted earlier, tuning thresholds may be varied by the controller 106 when analyzing the collective performance of the tuning algorithms as well as individual performance of select algorithms.

At step 1624, the tuning algorithm controlling the output power of the amplifier 1502 can measure with sensor 1508 output power relative to a power step applied to the amplifier 1502. If the output power is outside of expected tuning threshold(s) at step 1626, then the tuning algorithm can proceed to step 1627 where it adjusts a tunable reactive element, bias, power supply or combinations thereof of the power amplifier 1502. After the adjustment, the control loop returns to step 1608 where the tuning algorithms are given an opportunity to determine how the adjustment at step 1627 has impacted them. If the impact is within their respective preemption thresholds, then the tuning algorithm of step 1622 can continue the tuning process until the output power of the amplifier 1502 has achieved or exceeded the desired tuning threshold at step 1626, or until such time as the tuning period has expired or preemption has occurred. Once the tuning threshold of step 1626 has been achieved, the controller 106 can invoke the tuning algorithm at step 1628 which controls the efficiency and linearity of the power amplifier 1502.

Tuning efficiency and linearity can be controlled by varying the bias and supply power used by the power amplifier 1502 with or without the use of a tunable reactive element. The forward detector 1508 can supply a signal which can be digitally sampled with an analog to digital converter. The digital data derived from the sampled signal can be processed by the tuning algorithm to determine a measure of the output power of the amplifier 1502. The tuning algorithm can also utilize the sampled signal to calculate peak power and average output power of the amplifier 1502. A current sensor (not shown) can be used to measure the current drain of the power amplifier 1502. At step 1632 the tuning algorithm can utilize the measurements of output power and current drain to compute the efficiency of the amplifier 1502. In addition, the tuning algorithm can utilize the measurements of peak power, average output power and knowledge of the modulation present on the transmitted signal to determine the linearity of the amplifier 1502. The efficiency and linearity can be compared to corresponding thresholds to determine at step 1632 if an adjustment is necessary at step 1633. If either of these measures is outside the desirable thresholds, then the tuning algorithm can calculate and assert an adjustment to among other things the bias voltage(s), the power supply, the supply voltage, and/or controls to a tunable reactive element coupled to the amplifier 1502. The control loop then returns to step 1608. Once the efficiency and linearity have achieved their respective thresholds, the controller 106 can return to step 1608 and continue the tuning process described above.

Alternatively, if the communication device 100 has changed its physical or functional state (e.g., speakerphone has been asserted, flip has been closed, and/or the frequency band has been changed to a lower band, etc.), then the controller 106 can interrupt the tuning algorithms and proceed to step 1602 and reinitiate the configuration of the algorithms and circuit components according to the open-loop settings derived from the look-up table of FIG. 7. It should be noted that in subsequent reconfiguration cycles, the controller 106 can be adapted to use historical settings rather than the open-loop settings if the change in the physical and/or functional use case is similar to the previous use cases. Returning to step 1602 can occur at any time (not just at step 1632). To accommodate the ad hoc nature of changes to physical and/or functional use cases, the controller 106 can be configured to detect these changes with an interrupt scheme which can have a higher preemptive capability than any of the priority levels of the tuning algorithms.

As noted earlier, optimization of any one tuning algorithm or attribute controlled by a tuning algorithm may not always be desirable. FIGS. 17-21 and their corresponding descriptions provide illustrative embodiments of how the aforementioned algorithms and their thresholds, and other configurable parameters can be designed to accommodate a holistic tuning approach that relies on figures of merit rather than fixed optimization targets.

Figure 17:
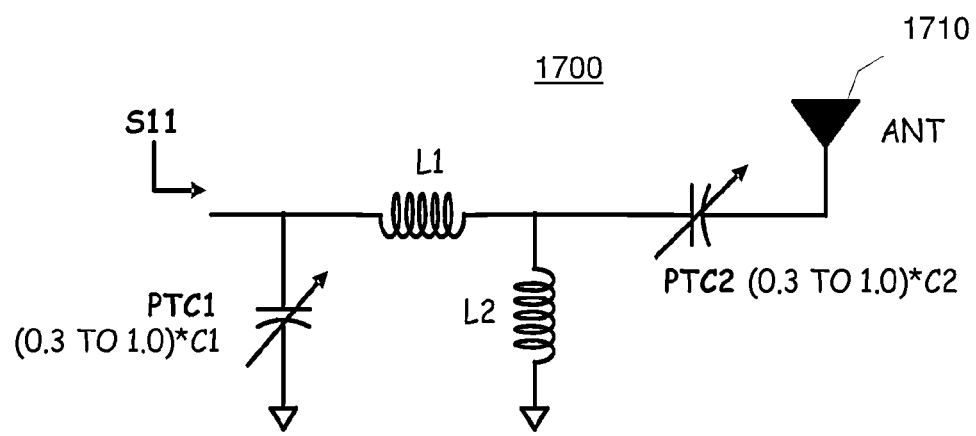
FIG. 17 depicts an illustrative embodiment of a tunable circuit that can be used by a tuning algorithm.

FIG. 17 depicts a circuit diagram illustrating an exemplary matching circuit 1700 that can be used in a closed-loop tuning algorithm. The illustrated matching circuit 1700 includes a first tunable capacitance PTC1, a first impedance L1, a second impedance L2 and a second tunable capacitance PTC2. A PTC is a tunable capacitor with a variable dielectric constant that can be controlled by a tuning algorithm with the control circuit 302 of FIG. 3. The first tunable capacitance PTC1 is coupled to ground on one end and to the output of a transceiver on the other end. The node of PTC1 that is coupled to the transceiver is also connected to a first end of the first impedance L1. The second impedance L2 is connected between the second end of the first impedance L1 and ground. The second end of the first impedance L1 is also coupled to a first end of the second tunable capacitance PTC2. The second end of the second tunable capacitance PTC2 is then coupled to an antenna 1710.

The tunable capacitances can be tuned over a range such as, for example, 0.3 to 1 times a nominal value C. For instance, if the nominal value of the tunable capacitance is 5 pF, the tunable range can be from 1.5 to 5 pF. In an exemplary embodiment, PTC1 can have a nominal capacitance of 5 pF and is tunable over the 0.3 to 1 times range, the first impedance L1 can have a value of 3.1 nH, and the second impedance L2 can have a value of 2.4 nH and the second tunable capacitance PTC2 can have a nominal value of 20 pF and can be tuned over a range of 0.3 to 1 times the nominal value. It will be appreciated that the tunable capacitances in the illustrated embodiment could be tuned or adjusted over their ranges in an effort to improve the matching characteristics of the antenna 1710 under various operating conditions. Thus, under various use conditions, operating environments and at various frequencies of operation, the tunable capacitances can be adjusted to attain a desired level of performance.

Figure 18:
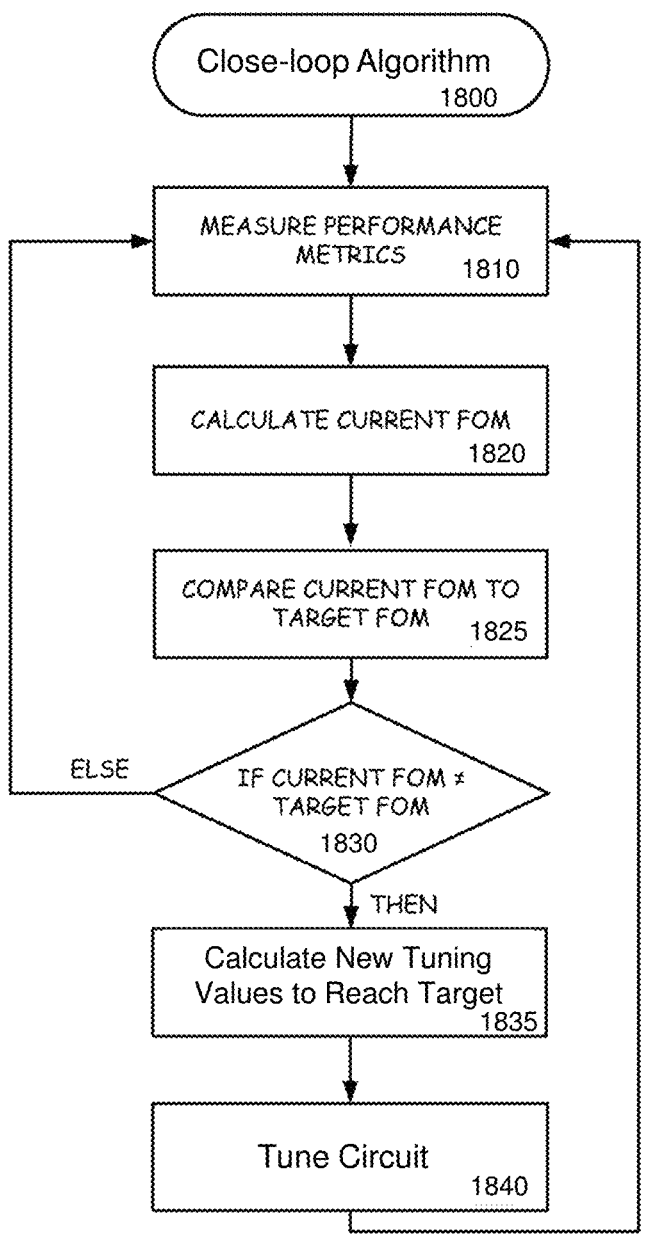
FIG. 18 depicts an illustrative embodiment of a tuning algorithm that can be used to tune the tunable circuit of FIG. 17.

FIG. 18 is a flow diagram illustrating a method 1800 that can be used to tune the circuit of FIG. 17. The basic flow of the algorithm 1800 initially includes measuring the performance parameters or metrics 1810 used as feedback pertaining to the performance of the closed-loop system or the impedance match between a transceiver and an antenna. The performance metrics utilized may vary over various usage scenarios, over modulation being utilized (i.e. Frequency Division Multiplexing or FDM, Time Division Multiplexing or TDM, etc.), based on system settings and/or carrier requirements, etc. For instance, in an illustrative embodiment, the performance metrics can include one or more of the following transmitter related metrics: the transmitter return loss, output power, current drain, and/or transmitter linearity.

Next, a current figure of merit (FOM) is calculated at step 1820. The current FOM is based on the one or more performance metrics, as well as other criteria. The current FOM is then compared to a target FOM at step 1825. The target FOM is the optimal or desired performance requirements or objective for the closed-loop system. As such, the target FOM can be defined by a weighted combination of any measurable or predictable metrics. For instance, if it is desired to maximize the efficiency of the transmitter, the target FOM can be defined to result in tuning the matching network accordingly. Thus, depending on the goal or objective, the target FOM can be defined to tune the matching network to achieve particular goals or objectives. As a non-limiting example, the objectives may focus on total radiated power (TRP), total isotropic sensitivity (TIS), efficiency and linearity. Furthermore, the target FOM may be significantly different for a TDM system and an FDM system. It should be understood that the target FOM may be calculated or selected based on various operating conditions, prior measurements, and modes of operation or, the target FOM can be determined at design time and hard-coded into the closed-loop tuning algorithm 1800.

If it is determined that the current FOM is not equal to the target FOM, or at least within a threshold value of the target FOM 1830, new tuning values can be calculated or selected at step 1835. However, if the current FOM is equal to or within the defined threshold, then processing continues by once again measuring the performance metrics 1810 and repeating the process. Finally, if the current FOM needs to be adjusted towards the target FOM, the tuning algorithm can determine new tuning values for the matching network in an effort to attain or achieve operation at the target FOM 340. In some embodiments, this new tuning value may also be stored as a new default tuning value of the transmitter at the given state of operation. For instance, in one embodiment, a single default value can be used for all situations, and as such, the latest tuning values can be stored in a variable location. In other embodiments, a default tuning state may be maintained for a variety of operational states, such as band of operation, use case scenario (i.e., hand held, antenna up/down, slider in/out, etc.) and depending on the current operational state, the new tuning values may be stored into an appropriate default variable.

In one embodiment, the closed-loop tuning algorithm can tune one or more of the tunable components of the circuit of FIG. 17 at step 1840, measure the new FOM (i.e., based on the transmitter reflected loss) at steps 1820-1830, and re-adjust or retune the matching network accordingly to steps 1835-1840 in a continuous loop. This process can adapt a tunable circuit from a non-matched state towards a matched state one step at a time. This process can be continued or repeated to attain and/or maintain performance at the target FOM. Thus, the process identified by steps 1810 through 1840 can be repeated periodically as needed, or otherwise. The looping is beneficial because even if performance at the target FOM is attained, adjustments may be necessary as the mode of operation (such as usage conditions) of the communication device changes and/or the performance of the transmitter, the antenna or the matching circuitry change over time.

In other embodiments, the tunable components can be set based on look-up tables or a combination of look-up tables and by performing fine-tuning adjustments. For instance, the step of calculating tuning values at step 1835 may involve accessing initial values from a look-up table and then, on subsequent loops, fine tuning the values of the components in the circuit of FIG. 17.

In one embodiment where a communication device is operating within a TDM environment, the tuning algorithm can be configured to optimize the operation of the transmitter during a transmit time slot. In such an embodiment, the performance metric may be the transmitter return loss. In addition, the target FOM in such an embodiment may be a function of the transmitter return loss. In this embodiment, the tuning algorithm can be configured to minimize the FOM or the transmitter return loss. More particularly, for the circuit illustrated in FIG. 17, this embodiment can operate to tune the values of PTC1 and PTC2 to minimize the transmitter return loss during the transmit time slot. For this particular example, the algorithm of FIG. 18 can include measuring the transmitter return loss, calculating adjustment values for PTC1 and PTC2 to optimize an FOM that is a function of the transmitter return loss, tuning the matching network by adjusting the values of PTC1 and PTC2 and then repeating the process.

The adjustment values for PTC1 and PTC2 can be determined in a variety of ways. For instance, in one embodiment the values may be stored in memory for various transmitter frequencies and usage scenarios. In other embodiments, the values may be heuristically determined by making adjustments to the tuning circuit, observing the effect on the transmitter return loss, and compensating accordingly. In yet another embodiment, a combination of a look-up table combined with heuristically determined tuning can be used to adjust the matching network of FIG. 17.

During the receiver time slot, the tuning algorithm can be reconfigured to optimize or improve the performance of the receiver. Similar to the adjustments during the transmit time slot, particular performance parameters may be measured and used to calculate a current FOM. However, it may be difficult to measure such performance parameters for the receiver. In one embodiment the tuning algorithm can be configured to apply a translation to the tuning values of the matching network derived during the transmitter time slot, to improve performance during the receive time slot. During the design of the transmitter and receiver circuitry, the characteristics of performance between the transmitter operation and receiver operation can be characterized. This characterization can then be used to identify an appropriate translation to be applied. The translation may be selected as a single value that is applicable for all operational states and use cases or, individual values which can be determined for various operational states and use cases.

Figures 19A, 19B:
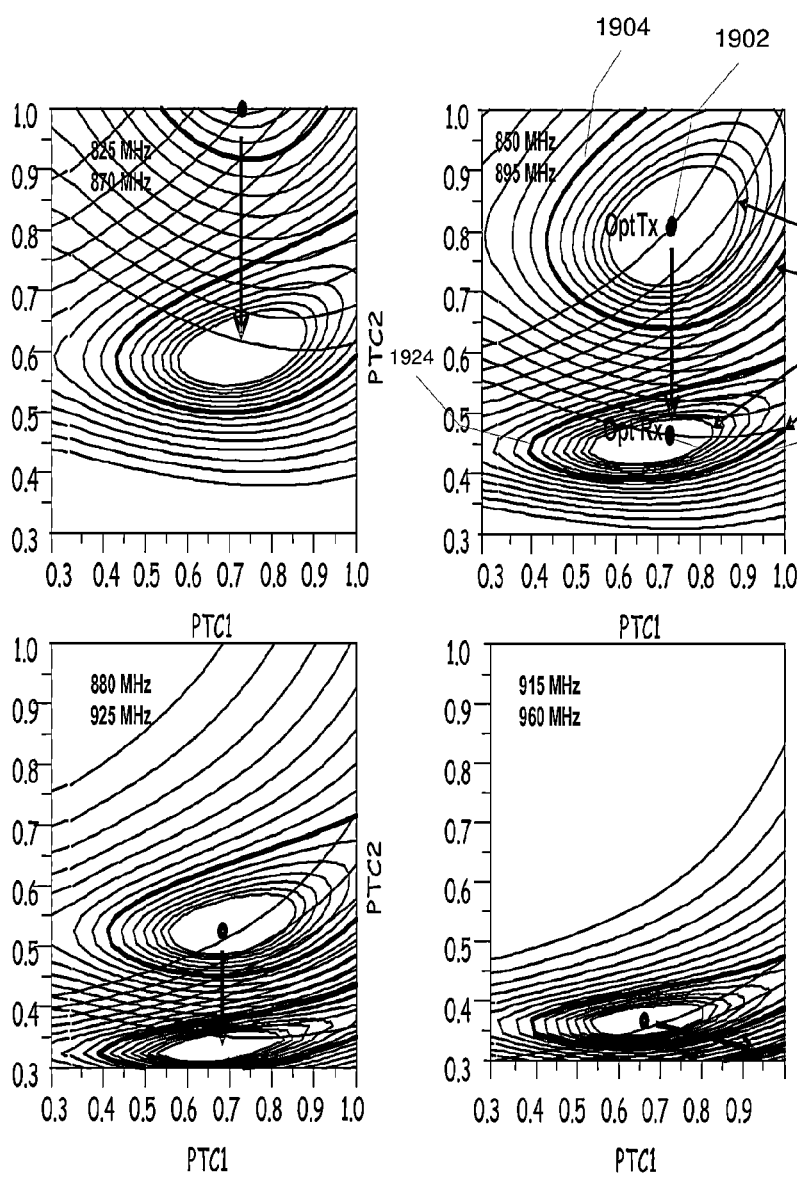
FIGS. 19A-19B depict illustrative embodiments of plots of transmitter reflection losses for four operating frequencies.

FIGS. 19A-19B are plots of transmitter reflection losses for four operating frequencies of a transceiver. The contours show the increasing magnitude of the reflection loss in 1 dB increments. For instance, in FIG. 19A, the inside contour for the transmitter 1906 is 20 dB and the bolded contour at 1904 is 14 dB. Operation at the center of the contours 1902 is optimal during transmitter operation. In the illustrated example, by adjusting the value of PTC2 by adding an offset, significant performance improvements can be achieved in the receiver time slot by moving the operation towards point 1912. The translation varies depending on a variety of circumstances and modes of operation including the frequency of operation, usage of the device, housing design, and transceiver circuitry.

In the illustrated example, the performance is determined to be greatly improved for the receiver time slot if the value of PTC2 for receiver operation is adjusted to be 0.6 times the value of PTC2 used for the optimal transmitter setting and the value of PTC 1 remains the same. This is true for each of the illustrated cases except at the 915 MHz/960 MHz operational state. At 960 MHz, it is apparent that significant receiver improvement can be realized by also adjusting the value of PTC1 from its transmitter value. In the illustrated example, by examining the characteristics of the circuitry it can be empirically derived that a suitable equation for operation of the receiver at 960 MHz can be:

$$PTC1\_Rx = PTC\_1\_Tx + 1 - 1.8 * PTC2\_Tx.$$

It should be noted that this equation is a non-limiting example of an equation that can be used for a particular circuit under particular operating conditions and the subject disclosure is not limited to utilization of this particular equation.

Figure 20:
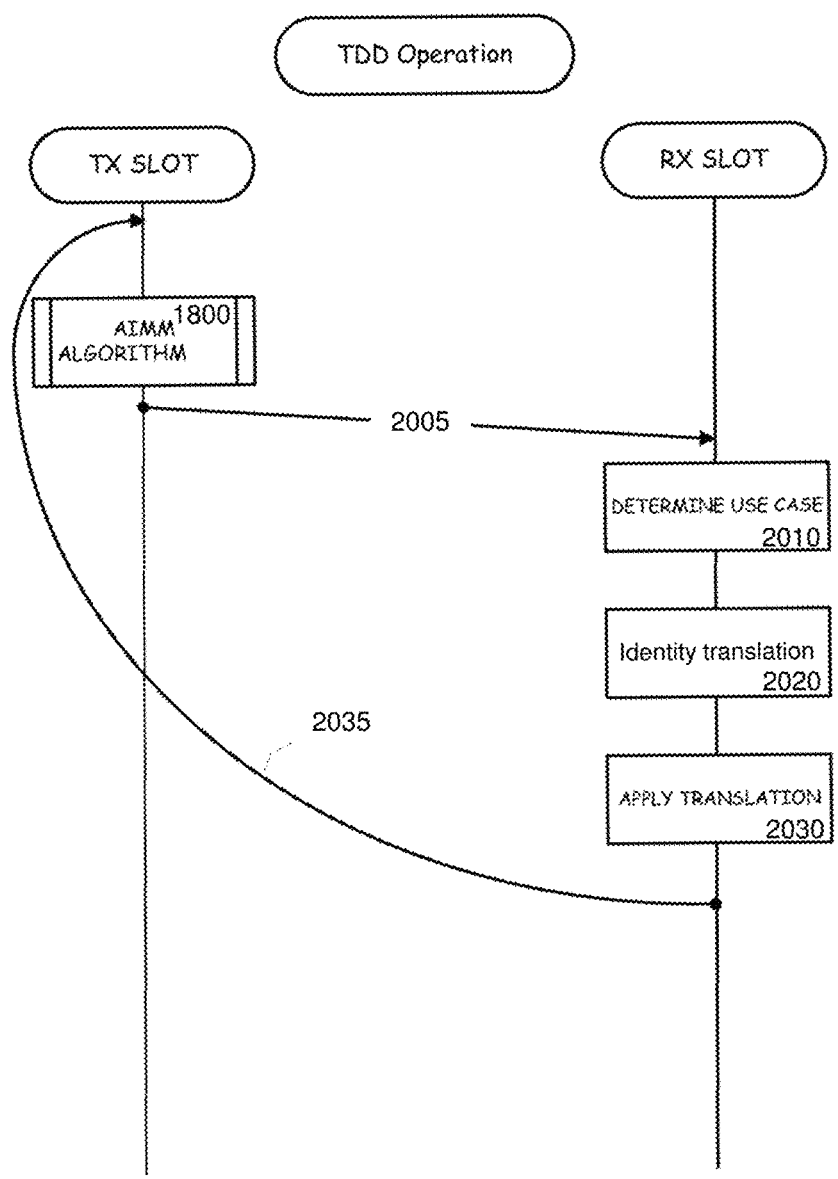
FIG. 20 depicts an illustrative embodiment of a tuning algorithm for tuning transmitter and receiver paths.

FIG. 20 is an illustrative embodiment of a method 2000 used in a TDM environment. During the transmitter time slot, the closed-loop algorithm 1800 presented in FIG. 18, or some other suitable algorithm, can be applied on a continual basis to move operation of the transmitter towards a target FOM. However, when the receive time slot is activated at step 2005, the closed-loop algorithm can be adjusted to match for the receiver frequency. The adjustment to the receiver mode of operation may initially involve determining the current operating conditions of the communication device at step 2010. Based on the current operating conditions, a translation for tuning of the various circuits of the closed-loop system can be identified at step 2020.

For instance, various states, components or conditions can be sensed and analyzed to determine or detect a current state or a current use case for the communication device. Based on this information, a particular translation value or function may be retrieved and applied. Such translations can be determined during the design phase when implementing the communication device and stored in a memory device of the communication device. The translations can be applied to the closed loop system 1800 at step 2030. When operation returns to the transmitter time slot at step 2035, the closed-loop algorithm 1800 again takes over to optimize operation based on the target FOM.

It should be understood that the translation applied to the closed-loop tuning algorithm 1800 during the receiver time slot can be based on the particular tuning circuit in use and can be determined during design phase of the communication device or on an individual basis during manufacturing and testing of the communication device. As such, the specific translations identified herein are for illustrative purposes only and should not be construed to limit the embodiments described by the subject disclosure.

For TDM systems, a tuning algorithm can operate to optimize operation of the communication device by tuning the matching circuit for an antenna according to a target FOM. During the receiver time slot, a translation can be applied to the tuned components to improve receiver performance. The target FOM can be based on a variety of performance metrics such as the reflection loss of the transmitter. The values for the tuned components can be set based on operational conditions determined by a look-up table, or by the use of heuristics during operation. The translations applied during the receiver operation can be determined empirically based on the design of the circuitry and/or testing and measurements of the operation of the circuit. In one embodiment, the tuning algorithm can tune the matching circuit during transmit mode based on non-receiver related metrics and then retune the circuit during receive mode operation based on a translation to optimize or attain a desired level of receiver operation.

In one embodiment when the communication device is operating within an FDM environment, the tuning algorithm can be adjusted so that the matching characteristics represent a compromise between optimal transmitter and receiver operation. Several techniques can be applied to achieve this compromise. In one embodiment, the translation applied in the TDM illustration above can be modified to adjust a tuning circuit as a compromise between the optimal transmit and receive settings. For instance, in the example circuit illustrated in FIG. 17, the value of PTC1 and PTC2 can be determined and adjusted periodically, similar to a TDM operation (even though such action may temporarily have an adverse effect on the receiver). Then, a translation can be applied to the values of PTC1 and PTC2 for the majority of the operation time. For instance, in the TDM example shown in FIG. 19, the transmitter values were adjusted by multiplying the PTC2 value by 0.6 in three modes of operation and using the above-identified equation during a forth mode of operation. This same scheme can be used in the FDM mode of operation. However, the scaling factor can be different to obtain an operation that is compromised between the optimal transmitter setting and optimal receiver setting. For example, multiplying the PTC2 value by 0.8 could attain an acceptable compromise.

In another embodiment, the tuning algorithm can be configured to attain a target FOM that is based on one or more transmitter related metrics (such as return loss) and the values of the adjustable components of a tunable circuit. In this embodiment, the tuning algorithm can continuously attempt to maintain a compromised state of operation that keeps the operation of the transmitter and the receiver at a particular target FOM that serving as a compromised performance metric level.

In the particular illustration applied to the circuit of FIG. 17, the tuning algorithm can be based on a target FOM that is an expression consisting of the transmitter return loss and the values of PTC1 and PTC2. Because the algorithm is not operating to minimize the transmitter return loss in the embodiment of an FDM system, a compromised value can be specified. For instance, a specific target transmitter return loss can be pursued for both transmitter and receiver operations by tuning the matching network based on an FOM that is not only a function of the return loss, but also a function of the values of PTC1 and PTC2 that will encourage operation at a specific level. The target FOM can be attained when the actual transmitter return loss is equal to the target transmitter return loss and, specified preferences for PTC1 and PTC2 are satisfied. In one embodiment, preferences can be for the value of PTC1 to be at the highest possible value and the value of PTC2 to be the lowest possible value while maintaining the transmit return loss at the target value and satisfying the PTC1 and PTC2 preferences.

Figure 21:
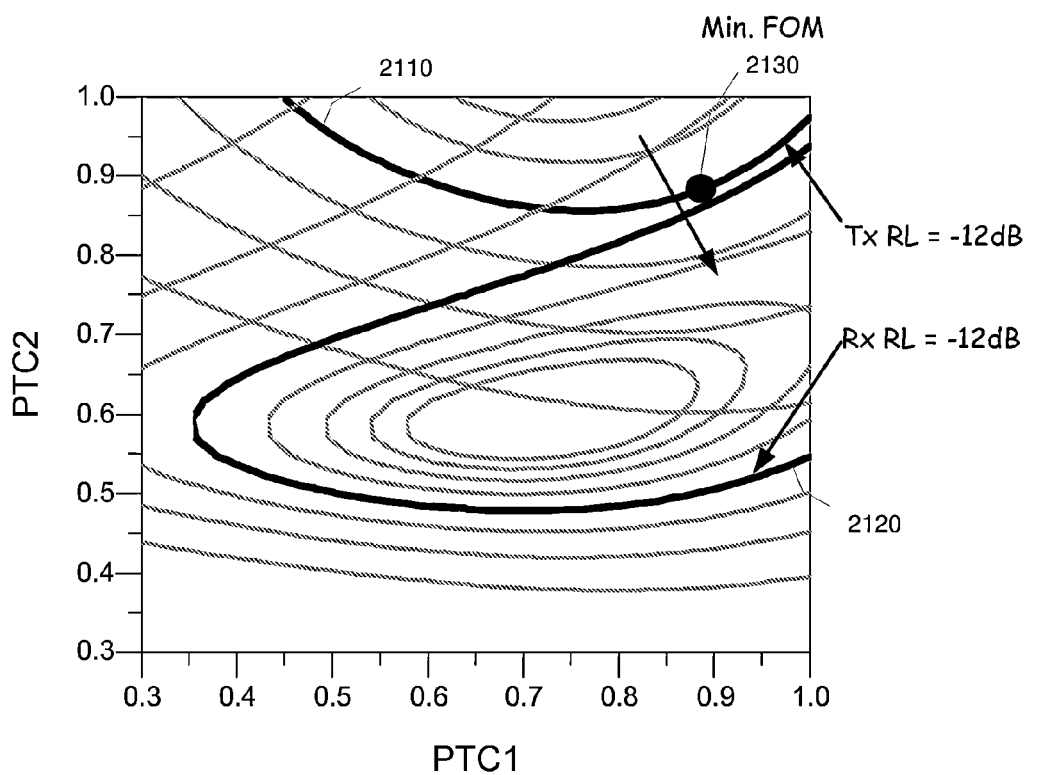
FIG. 21 depicts an illustrative embodiment of a return loss contour diagram in a tunable device plane for a particular frequency.

FIG. 21 is a return loss contour diagram in a PTC plane for a particular frequency (i.e., 825 MHz/870 MHz operation). Optimal operation in an FDM system cannot typically be attained because the settings for optimal transmitter operation most likely do not coincide with those for optimal receiver operation. As such, a compromise is typically selected. For instance, a compromise may include operating the transmitter at a target return loss value of −12 dB and at a point at which the transmitter −12 dB contour is closest to a desired receiver contour (i.e., −12 dB).

The operational goal of a tuning algorithm can be to attempt to maintain the matching circuit at a point where the operational metrics for the transmitter are at a target value (e.g., −12 dB) and the estimated desired receiver operation is proximate. In one embodiment, an equation used to express a target FOM for such an arrangement can be stated as follows:

$$\text{Target FOM} = f(Tx\_RL, TX\_RL\_\text{Target}) + f(PTC2, PTC1)$$

Where: TX_RL is the measure transmitter return loss and TX_RL_Target is the targeted transmitter return loss.

In an embodiment suitable for the circuit provided in FIG. 17, the FOM may be expressed as:

$$\text{FOM} = (Tx\_RL - Tx\_RL\_\text{Target}) + (C2*PTC2 - C1*PTC1),$$

Where C1 and C2 are preference constants or scaled values, and if Tx_RL>Tx_RL_Target then Tx_RL=Tx_RL_Target.

In operation, the foregoing embodiments can be used in a tuning algorithm to optimize a transmitter based on a target reflected loss to attain operation at the desired contour 2110 (as shown in FIG. 21) while adjusting the values of PTC1 and PTC2 to attain operation at a desired location 2130 (or minimum FOM) on the contour. The portion of the FOM equation including the TxRL and TX_RL_Target values ensures operation on the targeted RL contour 2110 (i.e., the −12 db RL contour). By observing the contour 2110, it is apparent that not all points on the target reflected loss contour can have the same value for the PTC1 and PTC2. Because of this, the values of PTC1 and PTC2 can be incorporated into the target FOM equation to force or encourage operation at a particular location on the reflected loss contour.

In the illustrated example, the target FOM can be the point at which the reflected loss contour is closest to the expected same valued reflected loss contour for the receiver. However, other performance goals may also be sought and the subject disclosure is not limited to this particular example. For instance, in other embodiments, the target FOM may be selected to encourage operation at a mid-point between optimal transmitter performance and expected optimal receiver performance. In yet another embodiment, the target FOM may be selected to encourage operation at a point that is a mid-point between a desired transmitter metric and an estimated or measured equivalent for the receiver metric.

In the example illustrated in FIG. 21, the optimum, compromised or desired point on the target contour is the point that minimizes the value of PTC2 and maximizes the value of PTC1 in accordance with the equation C2*PTC2−C1*PTC1. Thus, the portion of the expression including PTC1 and PTC2 ensures that operation is at a particular location on the contour that is desired—namely on the lower portion of the contour and closest to the RX_RL contour 2020. The tuning algorithm can operate to optimize the current FOM or, more particularly in the illustrated embodiment, to minimize the expression of C2*PTC2−C1*PTC1 as long as the desired TX_RL parameter is also met. It should be appreciated that the details associated with this example are related to a specific circuit design and a wide variety of relationships between adjustable components can differ on a circuit by circuit basis and as such, the subject disclosure is not limited to this specific example.

Another embodiment of a tuning algorithm may take into consideration historical performance of the tunable components as well as current values. As an example, as the tunable components are adjusted, changes in the current FOM will occur in a particular direction (i.e., better or worse). As an example, if tuning adjustments result in the current FOM falling on the top portion of a desired performance contour, making a particular adjustment may result in making the current FOM worse or better. If the adjustment was known to cause a certain result when the current FOM is located on the bottom of the contour and this time, the opposite result occurs, then this knowledge can help identify where the current FOM is located on the contour. Thus, knowing this information can be used in combination with operation metrics to attain the operation at the target FOM. For instance, the target FOM may be a function of operational metrics, current states of the tunable components, and the knowledge of previous results from adjusting the tunable components.

Stated another way, when a current FOM is calculated, the adjustments to reach the target FOM may take into consideration past reactions to previous adjustments. Thus, the adjustment to the tunable components may be a function of the FOM associated with a current setting and, the change in the current FOM resulting from previous changes to the tunable components.

In another embodiment in which the communication device is operating in an FDM environment, the FOM may be optimized similar to the operation in the TDM environment. For example, the FOM can be a function of the transmitter reflected loss metric and the tuning algorithm can be configured to optimize the FOM based on this metric. Once optimized, the tunable components can be adjusted based on a predetermined translation to move the FOM from an optimized state for the transmitter to a position that is somewhere between the optimal transmitter setting and the optimal receiver setting.

The aforementioned embodiments of a tuning algorithm and other variants can be applied to all or a subset of the algorithms described in FIG. 16.

Upon reviewing the aforementioned embodiments, it would be evident to an artisan with ordinary skill in the art that said embodiments can be modified, reduced, or enhanced without departing from the scope and spirit of the claims described below. For example, the configurations shown in FIGS. 13-15 can be modified by, for example, by eliminating some tunable circuits such as on-antenna tuning. Method 1600 can be adapted according to this modification. The configurations of FIGS. 13-15 can also be modified to include tunable reactive elements between antennas which may be subject to cross-coupling leakages. Method 1600 can be adapted to include a tuning algorithm to compensate for cross-coupling according to open-loop settings and closed-loop sampling. The initial execution order of the algorithms of FIG. 16 can be modified in any suitable order. For example, tuning algorithm of steps 1622-1627 can be moved to the beginning of the tuning process. The order of the remaining tuning algorithms can be maintained. It should also be noted that one or more tuning algorithms can be executed concurrently. Other embodiments are contemplated by the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device).

Figure 22:
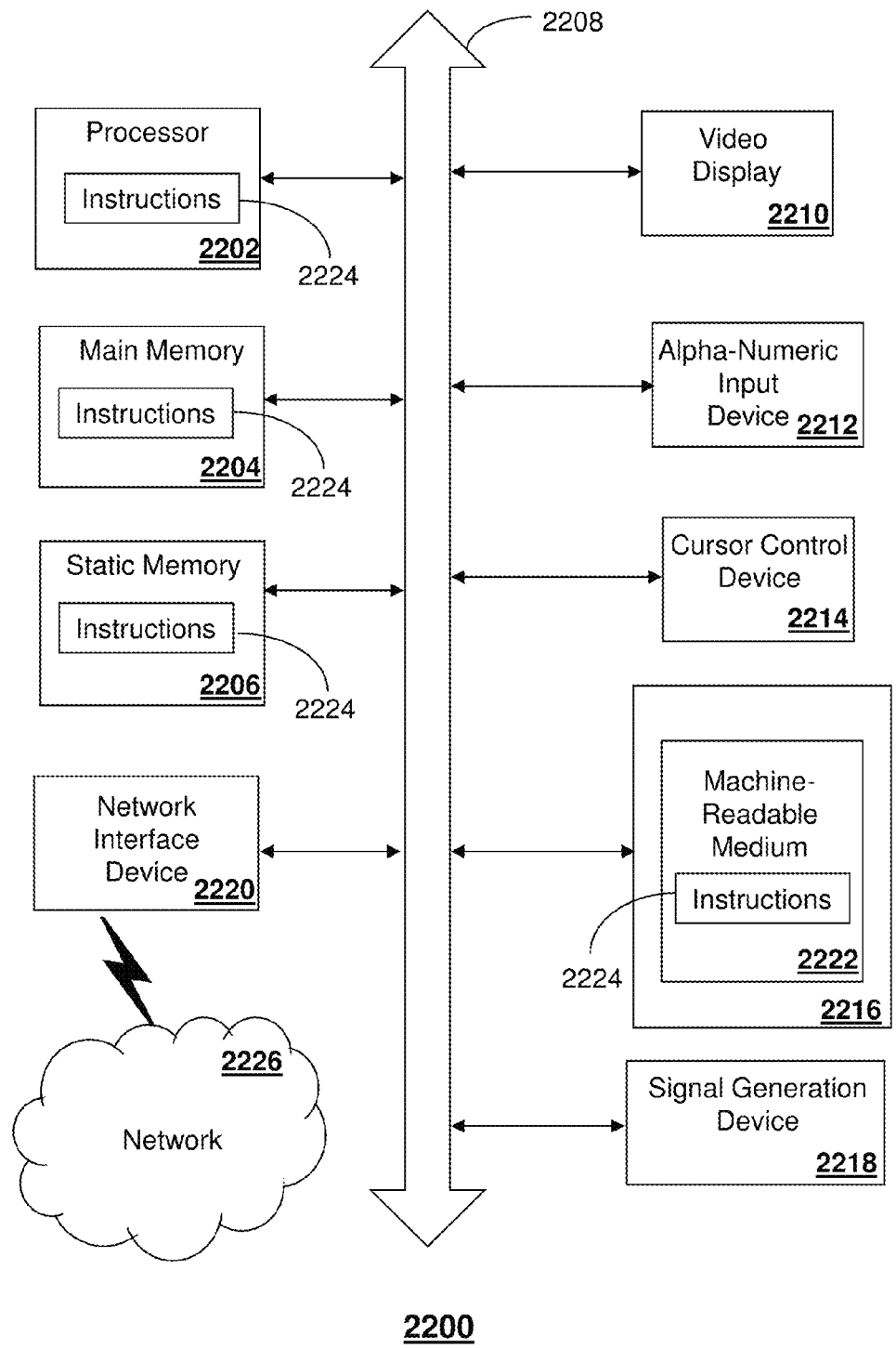
FIG. 22 depicts an illustrative diagrammatic representation of a machine in the form of a computer system within which a set of instructions, when executed, may cause the machine to perform any one or more of the methodologies disclosed herein.
Figure 5:
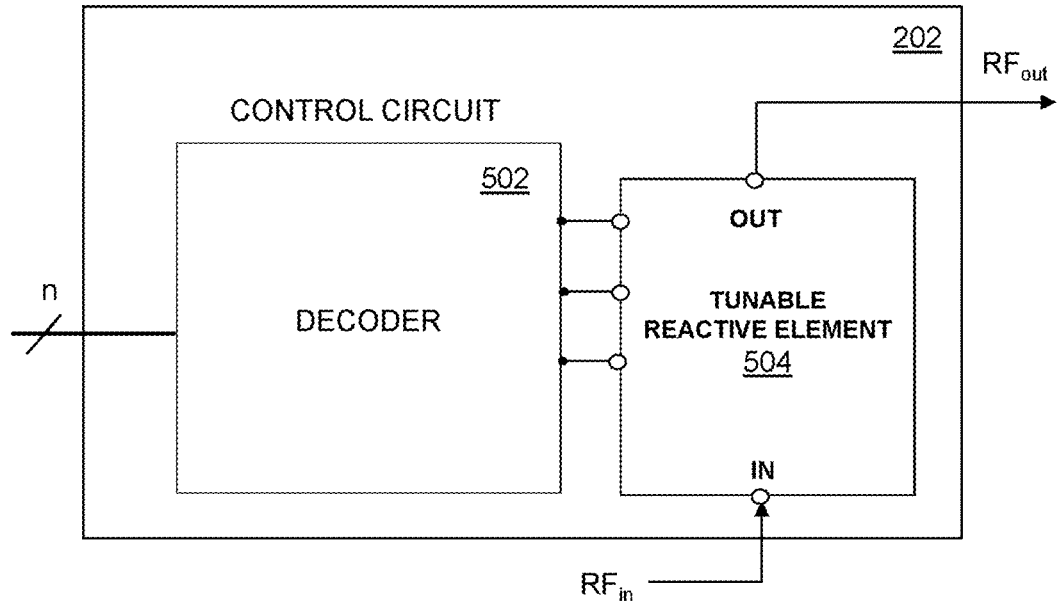
Figure 6:
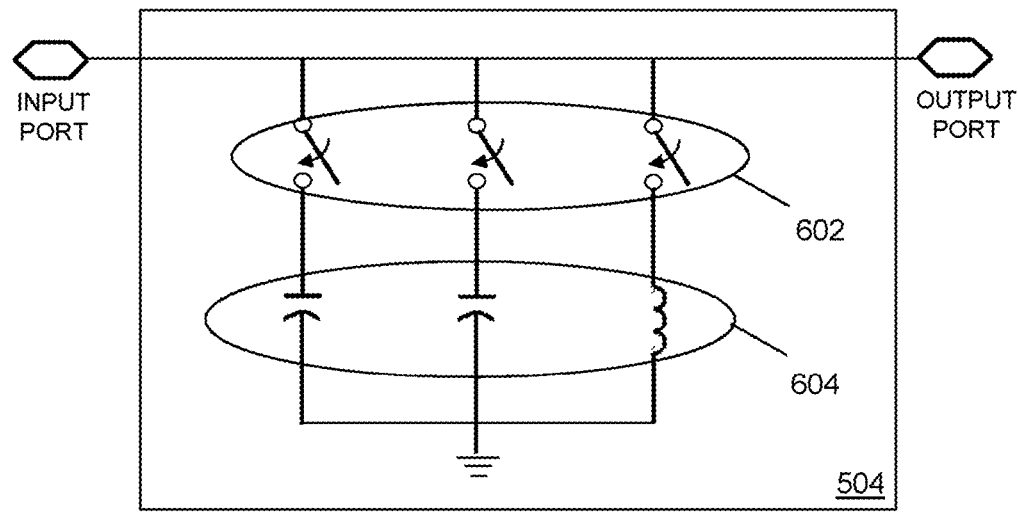

FIG. 22 depicts an exemplary diagrammatic representation of a machine in the form of a computer system 2200 within which a set of instructions, when executed, may cause the machine to perform any one or more of the methods discussed above. One or more instances of the machine can operate, for example, as the communication device 100 of FIG. 1. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2200 may include a processor (or controller) 2202 (e.g., a central processing unit (CPU), a graphics processing unit (GPU, or both), a main memory 2204 and a static memory 2206, which communicate with each other via a bus 2208. The computer system 2200 may further include a video display unit 2210 (e.g., a liquid crystal display (LCD), a flat panel, or a solid state display. The computer system 2200 may include an input device 2212 (e.g., a keyboard), a cursor control device 2214 (e.g., a mouse), a disk drive unit 2216, a signal generation device 2218 (e.g., a speaker or remote control) and a network interface device 2220.

The disk drive unit 2216 may include a tangible computer-readable storage medium 2222 on which is stored one or more sets of instructions (e.g., software 2224) embodying any one or more of the methods or functions described herein, including those methods illustrated above. The instructions 2224 may also reside, completely or at least partially, within the main memory 2204, the static memory 2206, and/or within the processor 2202 during execution thereof by the computer system 2200. The main memory 2204 and the processor 2202 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 2200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage device, comprising executable instructions, that when executed by a processing system including a processor, facilitate performance of operations comprising:

assigning a respective priority level to each tuning algorithm of a plurality of tuning algorithms, wherein each tuning algorithm of the plurality of tuning algorithms controls a respective one of a plurality of different tunable elements of a communication device;

executing a first tuning algorithm of the plurality of tuning algorithms according to a first priority level assigned to the first tuning algorithm;

executing a remainder of the plurality of tuning algorithms to determine whether the first tuning algorithm has affected a tuning state of each of the remainder of the plurality of tuning algorithms; and executing a second tuning algorithm of the plurality of tuning algorithms responsive to a stability condition of the first tuning algorithm and according to a second priority level assigned to the second tuning algorithm.

2. The non-transitory, machine-readable storage device of claim 1, wherein the operations further comprise:

detecting a plurality of use cases of the communication device;

determining an initial tuning state for each of the plurality of tuning algorithms according to the plurality of use cases; and configuring each of the plurality of tuning algorithms according to their respective initial tuning state.

3. The non-transitory, machine-readable storage device of claim 2, wherein the plurality of use cases comprise one of a physical use case of the communication device, an operational use case of the communication device, or both, and wherein the plurality of different tunable elements comprise one of a tunable reactive element, a control interface, one of a plurality of circuit components of a radio frequency circuit, a reactive element of an on-antenna tuner, or a combination thereof.

4. The non-transitory, machine-readable storage device of claim 1, further comprising detecting a use case of a plurality of use cases of the communication device, wherein the assigning of the respective priority level to each tuning algorithm is based upon the use case.

5. The non-transitory, machine-readable storage device of claim 1, wherein the operations further comprise reassigning a new respective priority level to each of the plurality of tuning algorithms.

6. The non-transitory, machine-readable storage device of claim 5, wherein the reassigning of the new respective priority level to each of the plurality of tuning algorithms is responsive to one of a detected change in a use case of the communication device, a detected change in an operational state of a tuning algorithm of the plurality of tuning algorithms, an aggregate error measured from tuning results provided by the plurality of tuning algorithms, or a combination thereof.

7. The non-transitory, machine-readable storage device of claim 1, wherein the operations further comprise configuring one of the first tuning algorithm or the second tuning algorithm to limit a tuning rate of a corresponding tuning element of the plurality of different tunable elements, limit a magnitude of each tuning step applied to the corresponding tuning element, limit a number of tuning steps applied to the corresponding tuning element, limit tuning of the corresponding tuning element to a tuning range, or combinations thereof.

8. A device, comprising:

a plurality of circuit components of a radio frequency circuit, wherein each circuit component of the plurality of circuit components comprises one of a tunable reactive element, a control interface, or both for enabling a tuning algorithm of a plurality of tuning algorithms to control an operation of the circuit component;

a memory that stores executable instructions; and a processing system including a processor coupled to the memory, wherein responsive to executing the instructions, the processor facilitates performance of operations comprising:

executing a first tuning algorithm of the plurality of tuning algorithms according to a first priority value of a plurality of priority values assigned to the first tuning algorithm of the plurality of tuning algorithms, wherein each of the plurality of tuning algorithms tunes a corresponding one of the plurality of circuit components of the radio frequency circuit;

executing a remainder of the plurality of tuning algorithms to determine whether the first tuning algorithm has affected a tuning state of each of the remainder of the plurality of tuning algorithms; and executing a second tuning algorithm of the plurality of tuning algorithms according to a second priority value of the plurality of priority values assigned to the second tuning algorithm of the plurality of tuning algorithms, wherein an ordering of the executing of the first tuning algorithm and the second tuning algorithm is based on the plurality of priority values.

9. The device of claim 8, wherein the tunable reactive element comprises a fixed reactive element controlled by one of a semiconductor device, a micro-electro-mechanical system device, or both to produce a variable reactance.

10. The device of claim 8, wherein the tunable reactive element comprises a variable reactive element controlled by one of a micro-electro-mechanical system device, a signal that varies a dielectric constant of the variable reactive element, or both to produce a variable reactance.

11. The device of claim 8, wherein the operations further comprise configuring a portion of a circuit component of the plurality of circuit components according to the priority value of the plurality of priority values assigned to each of the plurality of tuning algorithms.

12. The device of claim 8, wherein the operations further comprise identifying an order of execution of the plurality of tuning algorithms according to the priority value of the plurality of priority values assigned to each of the plurality of tuning algorithms.

13. The device of claim 12, wherein the operations further comprise reassigning the priority value of the plurality of priority values of each of the plurality of tuning algorithms.

14. The device of claim 8, wherein the operations further comprise one of detecting that the first tuning algorithm has asserted a flag indicating that the first tuning algorithm has reached a stability condition, or receiving a message from the first tuning algorithm indicating that the first tuning algorithm has satisfied a tuning threshold.

15. A method, comprising:

detecting, by a processing system including a processor, a plurality of use cases of a communication device;

determining, by the processing system, a respective initial tuning state for each of a plurality of tuning algorithms according to the plurality of use cases, wherein each of the plurality of tuning algorithms controls a respective one of a plurality of different tunable elements of the communication device;

configuring, by the processing system, each of the plurality of tuning algorithms according to the respective initial tuning state of each of the plurality of tuning algorithms;

executing, by the processing system, a first tuning algorithm of the plurality of tuning algorithms according to a respective priority level of a plurality of priority levels of the plurality of tuning algorithms;

executing, by the processing system, a remainder of the plurality of tuning algorithms to determine whether the first tuning algorithm has affected a tuning state of each of the remainder of the plurality of tuning algorithms; and executing, by the processing system, a second tuning algorithm of the plurality of tuning algorithms according to a respective priority level of the plurality of priority levels of the plurality of tuning algorithms.

16. The method of claim 15, further comprising preempting, by the processing system, a first tuning algorithm of the plurality of tuning algorithms based on a second tuning algorithm of the plurality of tuning algorithms having a lower priority level of the plurality of priority levels.

17. The method of claim 15, wherein the plurality of tuning algorithms comprise impedance tuning of multiple antennas of the communication device.

18. The method of claim 15, further comprising one of detecting, by the processing system, that the first tuning algorithm has asserted a flag indicating that the first tuning algorithm has reached a stability condition, or determining, by the processing system, a message from the first tuning algorithm indicating that the first tuning algorithm has satisfied a tuning threshold.

19. The method of claim 15, further comprising identifying, by the processing system, an order of execution of the plurality of tuning algorithms according to a priority level assigned to each of the plurality of tuning algorithms.

20. The method of claim 15, further comprising configuring, by the processing system, one of the first tuning algorithm or the second tuning algorithm to limit a tuning rate of a corresponding tunable element of the plurality of different tunable elements of the communications device, limit a magnitude of each tuning step applied to the corresponding tunable element, limit a number of tuning steps applied to the corresponding tunable element, limit tuning of the corresponding tunable element to a tuning range, or combinations thereof.

* * * * *

UNITED STATES PATENT AND TRADEMARK OFFICE
CERTIFICATE OF CORRECTION

PATENT NO. : 9,671,765 B2
APPLICATION NO. : 14/609512
DATED : June 6, 2017
INVENTOR(S) : Keith R. Manssen et al.

It is certified that error appears in the above-identified patent and that said Letters Patent is hereby corrected as shown below:

In the Drawings

Sheet 3 of 16; Figure 6, delete "404" and insert --504-- as shown on the attached sheet; and In the Specification Column 6, Line 19, delete "607" and insert --604--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*